United States Patent
Lee

(10) Patent No.: US 12,136,290 B2
(45) Date of Patent: Nov. 5, 2024

(54) DEVICE FOR RECOGNIZING FINGERPRINTS AND METHOD OF OPERATING THE SAME

(71) Applicant: UNIVERSITY-INDUSTRY COOPERATION GROUP OF KYUNG HEE UNIVERSITY, Yongin-si (KR)

(72) Inventor: Seung-Woo Lee, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 18/469,135

(22) Filed: Sep. 18, 2023

(65) Prior Publication Data
US 2024/0096128 A1    Mar. 21, 2024

(30) Foreign Application Priority Data
Sep. 19, 2022   (KR) .......................... 10-2022-0117579

(51) Int. Cl.
  *G06V 40/13*  (2022.01)
  *G06F 3/041*  (2006.01)
(52) U.S. Cl.
  CPC ........ *G06V 40/1318* (2022.01); *G06F 3/0412* (2013.01)
(58) Field of Classification Search
  CPC .......................... G06V 40/1318; G06F 3/0412
  See application file for complete search history.

(56) References Cited

U.S. PATENT DOCUMENTS

| 9,454,259 B2 | 9/2016 | Lee et al. |
| 2018/0157351 A1* | 6/2018 | Lee .......................... G06F 3/042 |

(Continued)

FOREIGN PATENT DOCUMENTS

| KR | 10-1923320 B1 | 11/2018 |
| KR | 10-2020-0002169 A | 1/2020 |
| KR | 10-2020-0139941 A | 12/2020 |

*Primary Examiner* — Premal R Patel
(74) *Attorney, Agent, or Firm* — Sughrue Mion, PLLC

(57) ABSTRACT

The present disclosure relates to a device for recognizing fingerprints and a method of operating the same. More particularly, the present disclosure relates to a technology for recognizing fingerprints without an additional sensor by driving an emission LED and detection LEDs among a plurality of light-emitting diodes (LEDs) constituting a pixel circuit of a display. The device for recognizing fingerprints according to one embodiment of the present disclosure may include a touch sensor for detecting a contact area on a display where a user's finger touches for fingerprint recognition; a pixel circuit that includes a plurality of light-emitting diodes (LEDs) and selectively drives the LEDs as an emission LED and detection LEDs according to the detected contact area, wherein the emission LED emits light to the detected contact area, the detection LEDs detect reflected light of the emitted light, and photocurrent according to the detected reflected light is accumulated in a capacitor of the detection LEDs; and a fingerprint recognizer for recognizing the user's fingerprint by distinguishing ridges and valleys in the contact area based on the accumulated photocurrent.

13 Claims, 21 Drawing Sheets

(56) References Cited

U.S. PATENT DOCUMENTS

| | | | |
|---|---|---|---|
| 2020/0258448 A1* | 8/2020 | Hargreaves | G09G 3/3208 |
| 2021/0117644 A1* | 4/2021 | Reynolds | G06V 40/1318 |
| 2022/0012453 A1* | 1/2022 | Choi | G09G 3/3233 |
| 2024/0046693 A1* | 2/2024 | Long | G06V 40/1318 |

* cited by examiner

320

DEVICE FOR RECOGNIZING FINGERPRINTS AND METHOD OF OPERATING THE SAME

CROSS-REFERENCE TO RELATED APPLICATION

This application claims priority to Korean Patent Application No. 10-2022-0117579, filed on Sep. 19, 2022, in the Korean Intellectual Property Office, the disclosure of which is incorporated herein by reference.

BACKGROUND OF THE DISCLOSURE

Field of the Disclosure

The present disclosure relates to a device for recognizing fingerprints and a method of operating the same, and more particularly, to a technology for recognizing fingerprints without an additional sensor by driving an emission LED and detection LEDs among a plurality of light-emitting diodes (LEDs) constituting a pixel circuit of a display.

Description of the Related Art

With the development of mobile devices, the importance of personal information is increasing. Accordingly, security systems for recognizing faces and fingerprints have been developed.

Facial recognition technology is inconvenient because the technology only works when the user's face is within a certain distance and the hat, glasses, or mask is removed.

In comparison, fingerprint recognition technology is important for mobile devices because the technology is easy to use and has excellent security.

A fingerprint is composed of two types of structures, ridges and valleys, with different heights, and the fingerprint may be identified using a sensor that detects the height difference.

Initially, a sensor was located independently on a display screen in the form of a button. However, recently, the sensor is relocated to the side or back of a device by reducing a display bezel to maximize screen size.

However, to give a user a pleasant experience by satisfying user demands for a display screen having a fingerprint recognition function and an extended display screen, it is necessary to integrate the fingerprint recognition function into the display.

However, any component in the path of light reflected by a fingerprint into a sensor must be transparent. Otherwise, display image quality may be degraded due to the moiré effect.

Despite deterioration in image quality, a sensor recognizes only the fingerprint of the location where the sensor is located, but each person has a different preferred location, and a recognition area must be expanded to cover an entire display screen, which increases production costs.

Particular efforts have been made to integrate fingerprint sensing into displays, and a capacitance method, which determines charge stored according to the distance from the valleys or ridges of a fingerprint, is widely used.

In a previous study (Kim-Lee et al.), a transparent capacitive screen fingerprint sensor was studied. According to this study, a transparent ITO electrode was installed as a fingerprint sensor on a display, and an attempt was made to minimize the moiré pattern caused by overlapping the repetitive pattern of the sensor and the display.

In addition, optical methods generally use an additional optical sensor to discriminate between the ridges and valleys of a fingerprint.

In a previous study (Kamada et al.), an organic photodiode was integrated into an organic light-emitting diode (OLED) for light intensity-sensitive fingerprint imaging.

The photodiode is located next to the OLED, and fingerprint imaging is possible by detecting light reflected by a fingerprint.

Similarly, a previous study (Peng et al.) proposed the optical design of a small wide-angle lens implanted in a display to recognize fingerprints.

The aforementioned technology may be used in displays with integrated fingerprint recognition function, but the technology require additional sensors or work only in a limited area rather than the entire screen.

A micro LED is a subminiature LED used as a self-emission device, may solve OLED problems such as burn-in and short lifespan, and has excellent brightness and power consumption. Accordingly, the micro LED is expected to be the next generation display following the OLED. Accordingly, in addition to a light-emitting device, multifunctionality of the micro LED is being studied.

For example, micro LEDs may act as temperature sensors based on I-V properties or light energy harvesters.

Upon forward bias, micro LEDs emit light, but upon reverse bias, a very low reverse current flows through the micro LEDs without emitting light.

Since reverse current depends on incident light, a diode can measure light intensity.

For example, in a previous study (Li et al.), a daylight detection LED system was studied. According to this study, LEDs detect an irradiance level and control luminous intensity according to this level.

SUMMARY OF THE DISCLOSURE

Therefore, the present disclosure has been made in view of the above problems, and it is an object of the present disclosure to provide a micro LED display device for recognizing fingerprints without an additional sensor by driving an emission LED and detection LEDs among a plurality of light-emitting diodes (LEDs) constituting a pixel circuit and a method of operating the same.

It is another object of the present disclosure to detect the intensity of reflected light using photocurrent of reverse biased detection LEDs by using, as photodetectors, some LEDs of a plurality of LEDs corresponding to an area in contact with a finger in a micro LED display device and using the remaining LEDs as light-emitting sources and to distinguish the ridges and valleys of a fingerprint based on the intensity of the reflected light.

It is still another object of the present disclosure to reduce cost required for adding hardware for fingerprint recognition by expressing data or recognizing fingerprints while emitting light using the same LEDs according to an area in contact with a finger in a pixel circuit of a micro LED display device.

It is yet another object of the present disclosure to improve user convenience by enabling fingerprint recognition on any area of a micro LED display device and to obtain high-resolution fingerprint images based on micro LEDs.

In accordance with one aspect of the present disclosure, provided is a device for recognizing fingerprints including a touch sensor for detecting a contact area on a display where a user's finger touches for fingerprint recognition; a pixel circuit that includes a plurality of light-emitting diodes (LEDs) and selectively drives the LEDs as an emission LED and detection LEDs according to the detected contact area, wherein the emission LED emits light to the detected contact area, the detection LEDs detect reflected light of the emitted light, and photocurrent according to the detected reflected light is accumulated in a capacitor of the detection LEDs; and a fingerprint recognizer for recognizing the user's fingerprint by distinguishing ridges and valleys in the contact area based on the accumulated photocurrent.

In the pixel circuit, among red, green, and blue LEDs included in the LEDs, at least one LED of the green and blue LEDs may be driven as the emission LED, and the red LED may be driven as the detection LED.

In the pixel circuit, when at least one LED of red, green, and blue LEDs included in the LEDs is driven as the emission LED and the red LED is driven as the detection LED, compared to a case in which any one LED of the green and blue LEDs is driven as the emission LED, photocurrent according to the detected reflected light may be increased and accumulated in a capacitor of the detection LED.

In the pixel circuit, the LEDs may be independently arranged at equal intervals, a critical angle may be determined with respect to the interval, and the emission LED and the detection LEDs among the LEDs may be selectively driven within an interval in which an incident angle at which the emitted light is detected by the detection LEDs is equal to the determined critical angle.

The pixel circuit may drive the LEDs as the emission and detection LEDs for the detected contact area on the display, and may drive the LEDs as display LEDs for representing images based on data input for the remaining areas other than the detected contact area.

The pixel circuit may determine the LED as an emission LED in any one line of a vertical line, a horizontal line, and a diagonal line between the vertical line and the horizontal line with respect to the detected contact area on the display, and may determine the LEDs as detection LEDs in a line corresponding to the any one line to selectively drive the emission LED and the detection LEDs.

In the pixel circuit, due to reverse current caused by a photoelectric effect of the detection LEDs, photocurrents of different sizes may be accumulated for the ridges and the valleys depending on a size of the detected reflected light, and a larger photocurrent may be accumulated for the ridges than for the valleys.

The fingerprint recognizer may determine intensity of first reflected light and intensity of second reflected light based on the accumulated photocurrent, and may classify, as the ridge, an area on the detection LEDs storing photocurrent corresponding to the greater light intensity among the intensity of the first reflected light and the intensity of the second reflected light and classify an area on the remaining detection LEDs as the valley.

In accordance with another aspect of the present disclosure, provided is a method of operating a device for recognizing fingerprints, the method including detecting, by a touch sensor, a contact area on a display in contact with a user's finger for fingerprint recognition; selectively driving, by a pixel circuit including a plurality of light-emitting diodes (LEDs), the LEDs as an emission LED and detection LEDs according to the detected contact area; emitting light from the emission LED to the detected contact area and detecting reflected light of the emitted light by the detection LEDs in the pixel circuit to accumulate photocurrent according to the detected reflected light in a capacitor of the detection LEDs; and recognizing, by a fingerprint recognizer, the user's fingerprint by distinguishing ridges and valleys in the contact area based on the accumulated photocurrent.

The selectively driving may include driving, as the emission LED, at least one LED of green and blue LEDs among red, green, and blue LEDs included in the LEDs and driving the red LED as the detection LED.

In the emitting, when at least one LED among red, green, and blue LEDs included in the LEDs is driven as the emission LED and the red LED is driven as the detection LED, compared to a case in which any one LED of the green and blue LEDs is driven as the detection LED, photocurrent according to the detected reflected light may be increased and accumulated in a capacitor of the detection LED.

The selectively driving may include independently arranging the LEDs at equal intervals, determining a critical angle with respect to the interval, and selectively driving the emission LED and the detection LEDs among the LEDs within an interval in which an incident angle at which the emitted light is detected by the detection LEDs is equal to the determined critical angle.

The selectively driving may include driving, by the pixel circuit, the LEDs as the emission and detection LEDs for the detected contact area on the display, and driving the LEDs as display LEDs based on data input for the remaining areas other than the detected contact area.

The emitting may include accumulating photocurrents of different sizes for the ridges and the valleys depending on a size of the detected reflected light due to reverse current caused by a photoelectric effect of the detection LEDs, wherein a larger photocurrent is accumulated for the ridges than for the valleys.

The recognizing may include determining intensity of first reflected light and intensity of second reflected light based on the accumulated photocurrent, and classifying, as the ridge, an area on the detection LEDs storing photocurrent corresponding to the greater light intensity among the intensity of the first reflected light and the intensity of the second reflected light and classifying an area on the remaining detection LEDs as the valley.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
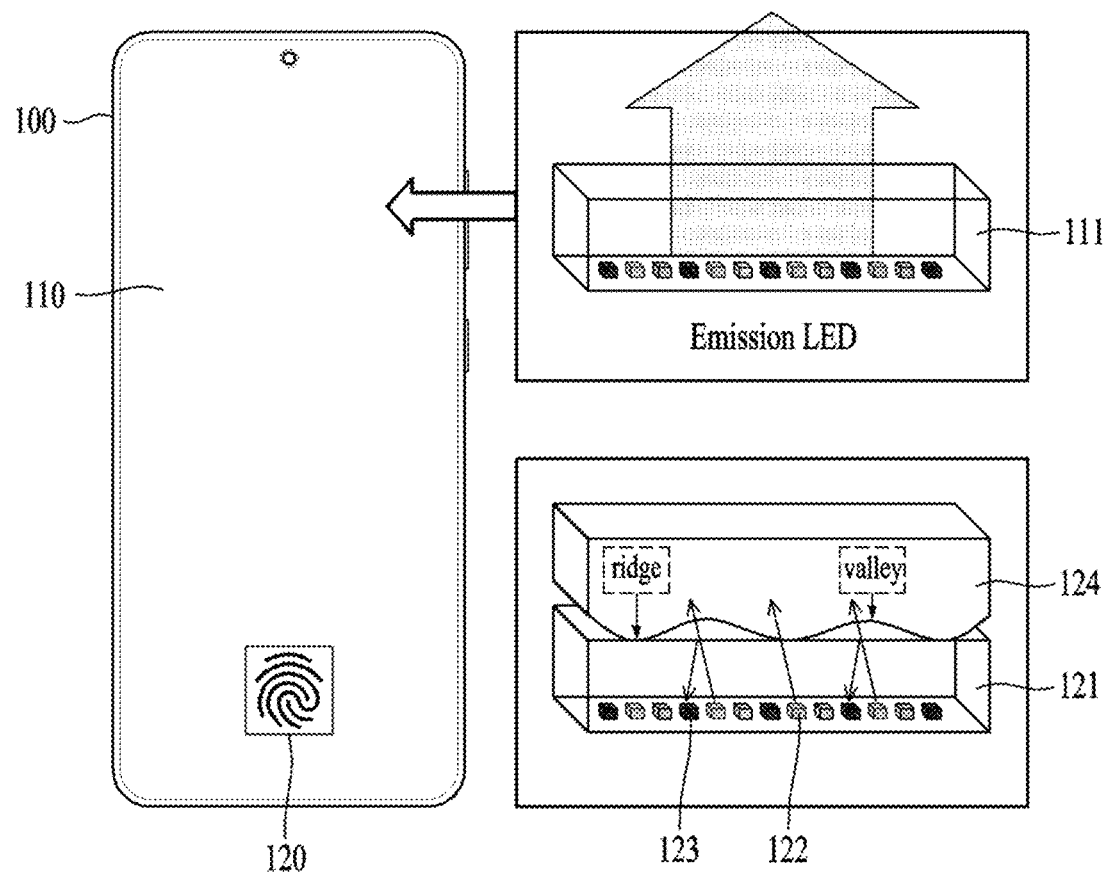
FIGS. 1 and 2 are diagrams for explaining a device for recognizing fingerprints according to one embodiment of the present disclosure.

Hereinafter, various embodiments of the present disclosure will be described with reference to the accompanying drawings.

However, it should be understood that the present disclosure is not limited to the embodiments according to the concept of the present disclosure, but includes changes, equivalents, or alternatives falling within the spirit and scope of the present disclosure.

In the following description of the present disclosure, detailed description of known functions and configurations incorporated herein will be omitted when it may make the subject matter of the present disclosure unclear.

The terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), the first element may be directly connected to the second element or may be connected to the second element via an intervening element (e.g., third).

As used herein, "configured to" may be used interchangeably with, for example, "suitable for", "ability to", "changed to", "made to", "capable of", or "designed to" in terms of hardware or software.

In some situations, the expression "device configured to" may mean that the device "may do ~" with other devices or components.

For example, in the sentence "processor configured to perform A, B, and C", the processor may refer to a general purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or".

That is, unless mentioned otherwise or clearly inferred from context, the expression "x uses a or b" means any one of natural inclusive permutations.

Terms, such as "unit" or "module", etc., should be understood as a unit that processes at least one function or operation and that may be embodied in a hardware manner, a software manner, or a combination of the hardware manner and the software manner.

Figure 2:
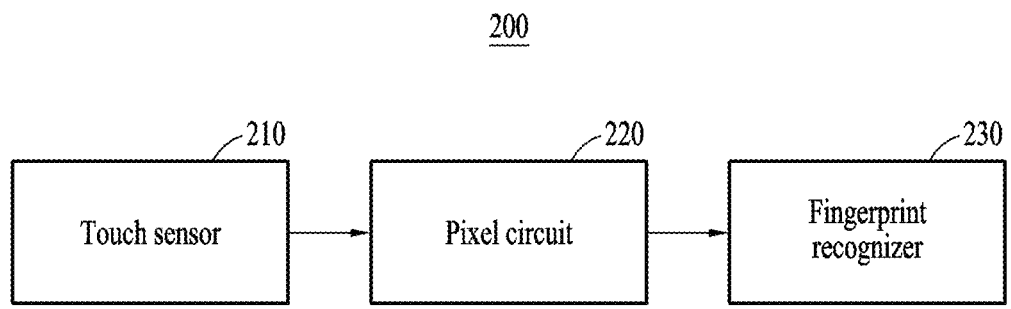

FIGS. 1 and 2 are diagrams for explaining a device for recognizing fingerprints according to one embodiment of the present disclosure.

FIG. 1 illustrates a driving structure for detecting ridges and valleys in a user's fingerprint by the device for recognizing fingerprints according to one embodiment of the present disclosure.

Referring to FIG. 1, in a device 100 for recognizing fingerprints according to one embodiment of the present disclosure, when a contact area 120 touched by a user's finger is sensed, a plurality of LEDs constituting pixel circuits 111 operate as display LEDs in a display area 110 for providing data such as image data.

In addition, in the device 100 for recognizing fingerprints according to one embodiment of the present disclosure, in the contact area 120 touched by a user's finger, a plurality of LEDs constituting pixel circuits 121 operate separately as emission LEDs 122 and detection LEDs 123 to recognize the ridge and valley of a fingerprint 124.

That is, the display area of the device 100 for recognizing fingerprints according to one embodiment of the present disclosure is divided into the contact area 120 and the display area 110, which is a non-contact area, when a user touches a display screen using a finger.

The display area 110 displays a general image regardless of a finger touching the screen.

For example, a plurality of LEDs may be composed of red LEDs, green LEDs, and blue LEDs and may be referred to as RGB LEDs.

Accordingly, the RGB LEDs of the display area 110 emit light according to color image data, which is an operation of an existing micro LED display.

In the contact area 120, the emission LEDs 122 and the detection LEDs 123 are separately operated to distinguish and recognize the ridges and valleys of a fingerprint at an area touched by a finger and to detect a reflected light at the area touched by the finger.

In the pixel circuits under the finger 121, the green LEDs serve as light sources and emit light, and the red LEDs detect light reflected at the interface between glass and a fingerprint.

In the red LEDs, due to the photoelectric effect of the LEDs, light reflected from a glass-air interface (fingerprint valley) changes the reverse current characteristics of the detection LEDs.

The device 100 for recognizing fingerprints may identify the ridges and valleys of a fingerprint by detecting the intensity of reflected light that varies at the interface between glass and the ridges of the fingerprint and the interface between the glass and the valleys.

The reverse current of the detection LEDs 123 is affected by light intensity, and photocurrent changes the voltage across an LED. The changed voltage is stored in the capacitor ($C_{LED}$) of the detection LEDs 123.

Accordingly, the device 100 for recognizing fingerprints may recognize and detect fingerprints in high resolution without additional sensors or light sources by detecting the degree of reflection through photocurrent accumulated in the capacitor ($C_{LED}$).

Accordingly, according to the present disclosure, cost required for adding hardware for fingerprint recognition may be reduced by displaying images or recognizing fingerprints using the same LEDs.

According to the present disclosure, user convenience may be improved by enabling fingerprint recognition on any area of a micro LED display device, and high-resolution fingerprint images may be obtained based on micro LEDs.

FIG. 2 illustrates the components of the device for recognizing fingerprints according to one embodiment of the present disclosure.

Referring to FIG. 2, a device 200 for recognizing fingerprints according to one embodiment of the present disclosure includes a touch sensor 210, a pixel circuit 220, and a fingerprint recognizer 230.

According to one embodiment of the present disclosure, the touch sensor 210 may detect a contact area for fingerprint recognition on a display where a user's finger touches.

For example, the touch sensor 210 may generate touch location information of a touch module that detects a touch of a user's finger on a display, and may detect a contact area using the generated touch location information.

According to one embodiment of the present disclosure, the pixel circuit 220 includes a plurality of light-emitting diodes (LEDs).

For example, the pixel circuit 220 may selectively drive a plurality of LEDs as emission LEDs and detection LEDs according to a detected contact area, the emission LEDs may emit light to the detected contact area, the detection LEDs may detect the reflected light of the emitted light, and photocurrent according to the reflected light may be accumulated in the capacitor of the detection LEDs.

According to one embodiment of the present disclosure, among red, green, and blue LEDs included in a plurality of LEDs, the pixel circuit 220 may drive at least one LED of green and blue LEDs as an emission LED and may drive the red LED as a detection LED.

For example, when the pixel circuit 220 drives, as an emission LED, at least one among red, green, and blue LEDs included in a plurality of LEDs and drives the red LED as a detection LED, compared to a case in which any one of green and blue LEDs is driven as the emission LED, the pixel circuit 220 may accumulate photocurrent depending on reflected light in the capacitor of the detection LED.

That is, when the pixel circuit 220 drives, as an emission LED, a green LED among red, green, and blue LEDs and drives the red LEDs as detection LEDs, the pixel circuit 220 may enhance fingerprint recognition by increasing accumulation of photocurrent depending on reflected lights.

That is, the pixel circuit 220 may drive a green LED or blue LED as an emission LED and drive red LEDs as detection LEDs to increase the difference in photocurrent accumulation depending on intensities of the lights reflected from ridges and valleys.

For example, in the pixel circuit 220, each of a plurality of LEDs may be arranged at an equal distance, a critical angle may be determined in relation to the distance, and a plurality of LEDs may be selectively driven as an emission LEDs and detection LEDs within the distance where the incident angle at which emitted light is sensed by detection LEDs is equal to the determined critical angle.

For example, the pixel circuit 220 may drive one to four detection LEDs to accumulate photocurrent depending on the intensities of lights reflected from ridges and valleys in the capacitor of the detection LEDs.

According to one embodiment of the present disclosure, the pixel circuit 220 may drive a plurality of LEDs as an emission LED and detection LEDs for a contact area on a display and may drive the LEDs as display LEDs based on input data for the remaining areas other than the detected contact area.

That is, the pixel circuit 220 may drive the remaining areas of a display to display image data except for an area used for fingerprint recognition.

For example, the pixel circuit 220 may determine a plurality of LEDs as emission LEDs in any one of a vertical line, a horizontal line, and a diagonal line under a area on a display, and may determine the LEDs as detection LEDs in a line corresponding to any one line to selectively drive the emission LEDs and the detection LEDs. For example, the diagonal line may be a line forming an arbitrary angle between the horizontal line and the vertical line.

The pixel circuit 220 may accumulate different photocurrents depending on the intensity of detected lights reflected from ridges and valleys due to reverse currents depending on the photoelectric effects of detection LEDs. At this time, the pixel circuit 220 may accumulate a larger photocurrent for the ridges than the valleys.

According to one embodiment of the present disclosure, the fingerprint recognizer 230 may include a fingerprint recognizer for recognizing a user's fingerprint by distinguishing ridges and valleys in a contact area based on photocurrents accumulated in the capacitor of detection LEDs.

For example, the fingerprint recognizer 230 may determine the intensity of first reflected light and the intensity of second reflected light based on accumulated photocurrents, and may classify an area on detection LEDs accumulating photocurrents corresponding to the higher light intensity among the intensity of the first reflected light and the intensity of the second reflected light as ridges, and may classify an area on the remaining detection LEDs as valleys.

For example, when lights emitted from an emission LED are reflected and photocurrents accumulated in detection LEDs are relatively large, the fingerprint recognizer 230 recognizes that the intensity of the reflected lights are high, and recognizes an area on the corresponding detection LEDs as the ridges of a fingerprint.

In addition, when lights emitted from an emission LED are reflected and photocurrents accumulated in detection LEDs are relatively low, the fingerprint recognizer 230 recognizes that the intensity of the reflected lights are low, and recognizes an area on the corresponding detection LEDs as the valleys of a fingerprint.

The fingerprint recognizer 230 may recognize a fingerprint by recognizing ridges and valleys.

Accordingly, the present disclosure may provide a micro LED display device for recognizing fingerprints without an additional sensor by driving emission LEDs and detection LEDs among a plurality of light-emitting diodes (LEDs) constituting pixel circuits and a method of operating the same.

Figure 3A:
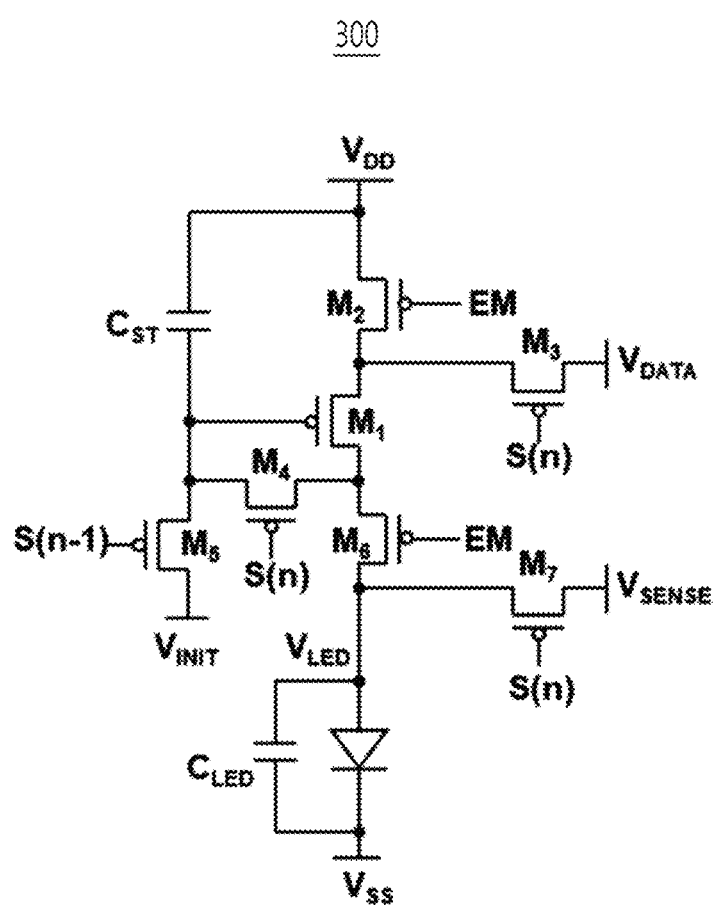
FIGS. 3A to 3C are diagrams for explaining the pixel circuit of a device for recognizing fingerprints according to one embodiment of the present disclosure.
Figure 3B:
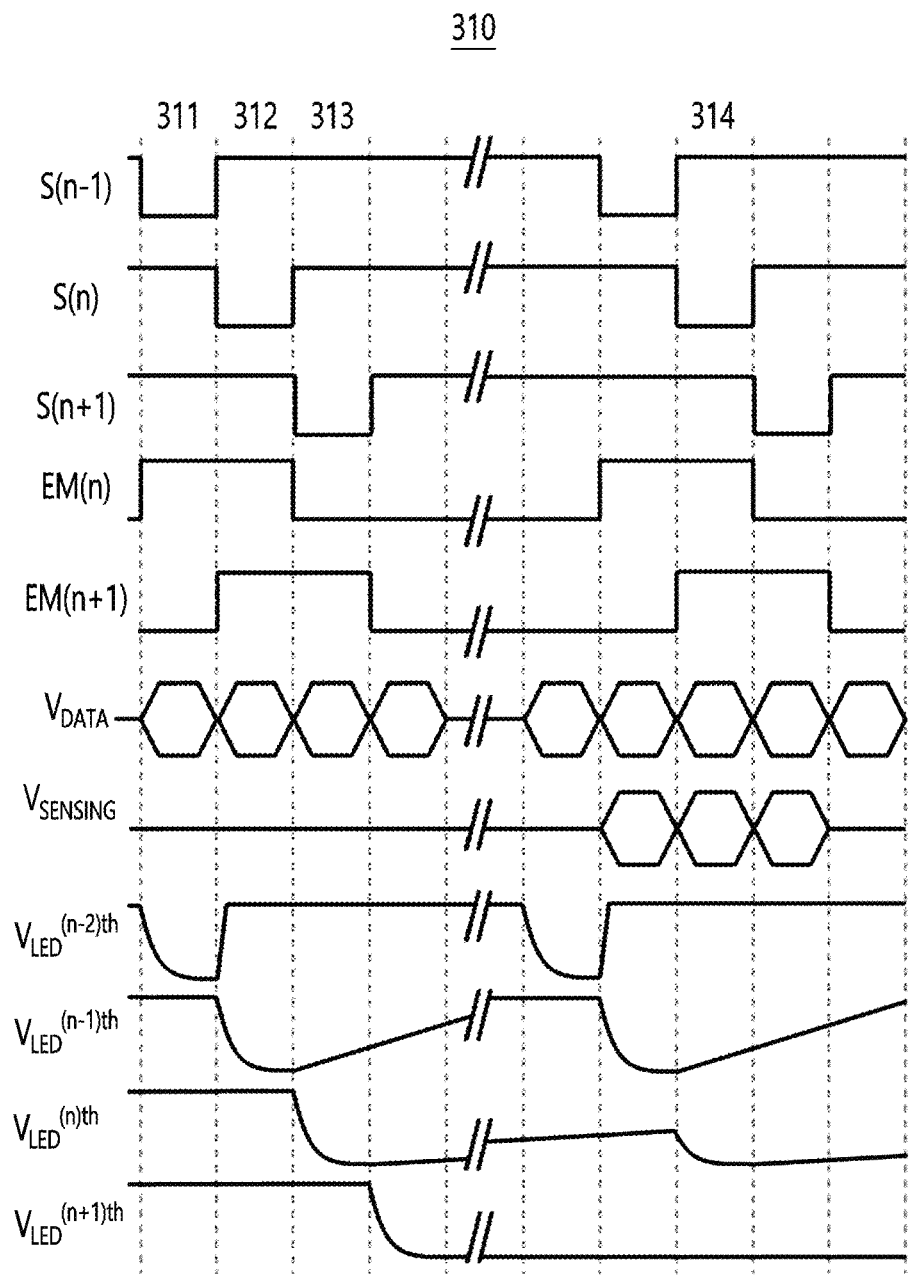
Figure 3C:
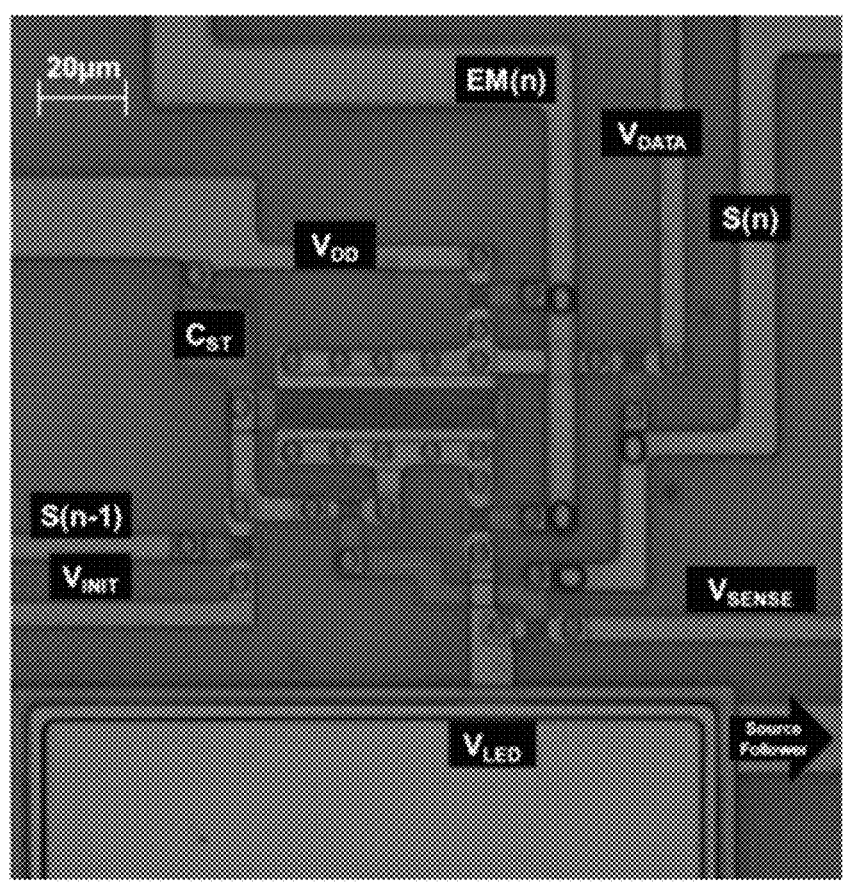

FIGS. 3A to 3C are diagrams for explaining the pixel circuit of the device for recognizing fingerprints according to one embodiment of the present disclosure.

FIG. 3A illustrates a circuit diagram of the pixel circuit of the device for recognizing fingerprints according to one embodiment of the present disclosure.

FIG. 3B illustrates a driving timing diagram of the pixel circuit of the device for recognizing fingerprints according to one embodiment of the present disclosure.

FIG. 3C shows a microscope image of the pixel circuit of the device for recognizing fingerprints according to one embodiment of the present disclosure.

Referring to FIG. 3A, a circuit diagram 300 of the pixel circuit of the device for recognizing fingerprints according to one embodiment of the present disclosure shows a pixel circuit for both emitting and sensing subpixels.

In the circuit diagram 300, a p-type LTPS TFT is used because of high mobility and stability thereof.

The conventional pixel circuit initializes only the anode of an LED, but the circuit of the circuit diagram 300 additionally senses the anode voltage ($V_{LED}$) of an internal capacitor ($C_{LED}$) through a charge amplifier.

The operation of the circuit diagram 300 is based on a driving timing diagram 310 of FIG. 3B.

Referring to FIG. 3B, the driving timing diagram 310 of the pixel circuit of the device for recognizing fingerprints according to one embodiment of the present disclosure includes a reset period 311, a programming period 312, an emission/exposure period 313, and a read period 314.

In the reset period 311, the emission and scan control signals of EM(n) and S(n) in line (n) are high during the reset period.

The reset period 311 turns off driving transistors $M_2$, $M_3$, $M_4$, $M_6$, and $M_7$.

$M_5$ is turned on because the scan control signal of the previous line S(n−1) becomes low, and then $V_{INIT}$ initializes the gate node of the driving transistor $M_1$.

During the programming period 312, S(n) moves to a low level to turn on the driving transistors $M_3$, $M_4$, and $M_7$.

Then, by the gate voltage of $M_1$, $V_{DATA}$−|Vth| is stored in a storage capacitor ($C_{ST}$).

When the pixel circuit operates in a display/emission mode, a data voltage corresponding to a gray level is applied.

When the pixel operates in a detection mode, a voltage is applied to turn off $M_1$, and the anode voltage of detection LED ($V_{LED}$) is initialized using a sensing voltage ($V_{SENSE}$) through $M_7$.

In addition, it is important to initialize the anode voltage of detection LED ($V_{LED}$) for uniform detection.

In the emission/exposure period 313, S(n) reaches a high level and turns off switching transistors $M_3$, $M_4$, and $M_7$; and current determined by the driving transistor $M_1$ may flow through LEDs in a display/emission mode when EM is low and $V_{DATA}$ corresponds to a gray level.

However, when $V_{DATA}$ is a sensing data, no current flows through $M_1$.

Accordingly, $V_{LED}$ is affected by reverse current according to light incident on LEDs.

In the driving timing diagram 310, pixels in lines (n−1), (n), and (n+1) operate as detection pixels, and a pixel in line (n−2) operates as an emitting pixel. For example, the pixel may refer to an LED or a pixel.

The (n−1)th pixel has the largest photocurrent, and the (n+1)th pixel has no photocurrent.

In the read period 314, after sufficient charge is accumulated in the $C_{LED}$, all driving signals are the same as those of the programming period 312.

However, during the read period 314, $V_{SENSE}$ is connected to a charge amplifier to read charge accumulated in $C_{LED}$.

Accordingly, during periods 311 to 313, $V_{SENSE}$ is maintained at an initialization voltage.

However, in the reset section of the next frame, a detection mode is activated.

During the read period 314, $V_{LED}$ is equal to the positive input voltage of a charge amplifier.

Since the data voltage of the (n)th pixel in the read period 314 is sensing data, the $V_{LED}$ (n)th may be continuously affected by the photocurrent of LEDs.

When the reverse current of the detection LED is large enough, exposure time is one frame time. Accordingly, sensing and reading may be performed for one frame.

Referring to FIG. 3C, a microscope image 320 of the circuit diagram of the pixel circuit of the device for recognizing fingerprints according to one embodiment of the present disclosure may be designed based on the parameters in Table 1 below.

TABLE 1

| Design parameters | Values |
|---|---|
| $M_1$ | 50 μm/10 μm |
| $M_2$-$M_7$ | 6 μm/6 μm |
| $C_{ST}$ | 100 fF |
| $V_{DD}$ | 5 V |
| $V_{SS}$ | 0 V |
| $V_{DATA}$ | 8 V (for detection) |
| | 1 V to 4 V (for display) |
| $V_{INIT}$ | −2 V |
| $V_{SENSE}$ | −5 V (for initiation) |
| S(n), S(n−1), EM(n) | −10 V to 10 V |

When accumulating photocurrent, the circuit condition of a detection pixel may be the same as that of displaying a pixel expressing a black level.

The only difference between detection and black pixels may be the value of $V_{LED}$.

Figure 4:
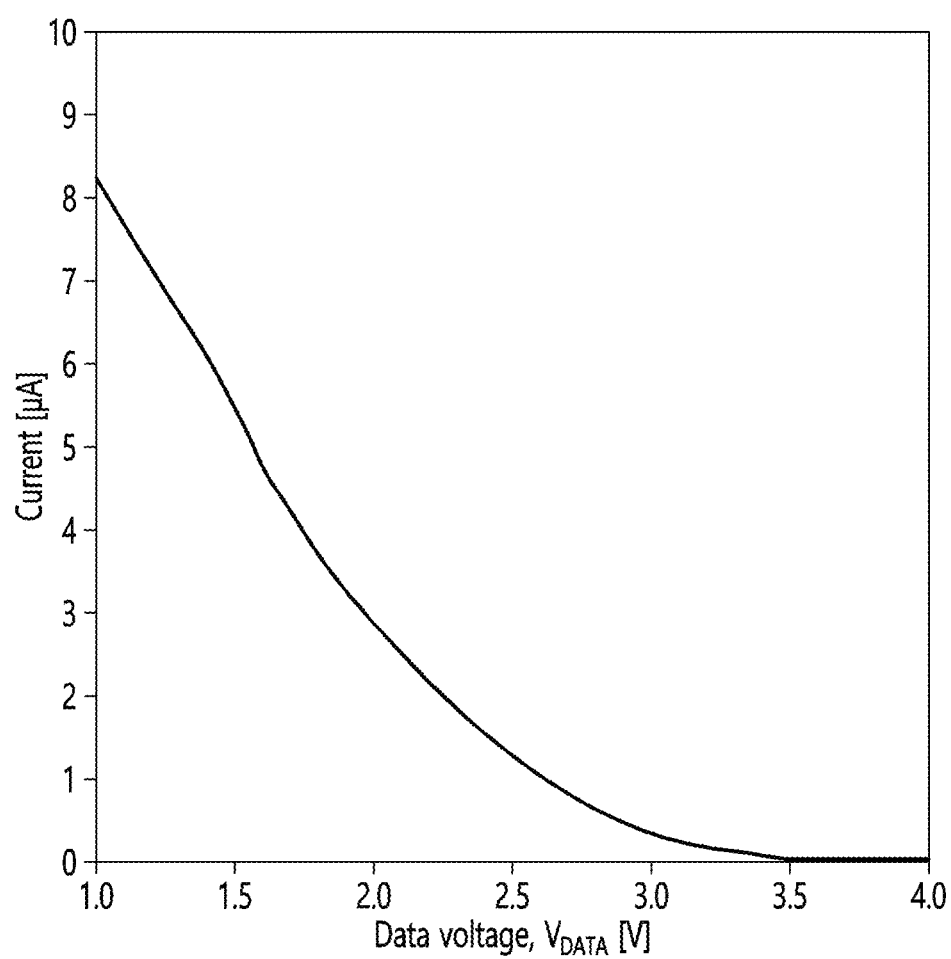
FIG. 4 is a graph for explaining the forward current characteristics of a red LED constituting a pixel circuit according to one embodiment of the present disclosure.

FIG. 4 is a graph for explaining the forward current characteristics of a red LED constituting a pixel circuit according to one embodiment of the present disclosure.

FIG. 4 is a basis for confirming that red LEDs constituting the pixel circuit according to one embodiment of the present disclosure are suitable as detection LEDs.

Referring to FIG. 4, a graph 400 shows forward current characteristics according to data voltage ($V_{DATA}$) when using red LEDs in a display/emission mode.

The output characteristics of the driving transistor $M_1$ are measured, and the result of calculating operating points using the I-V curve of red LEDs is shown.

The graph 400 shows the characteristic that the forward current of red LEDs decreases as data voltage ($V_{DATA}$) increases.

Figure 5:
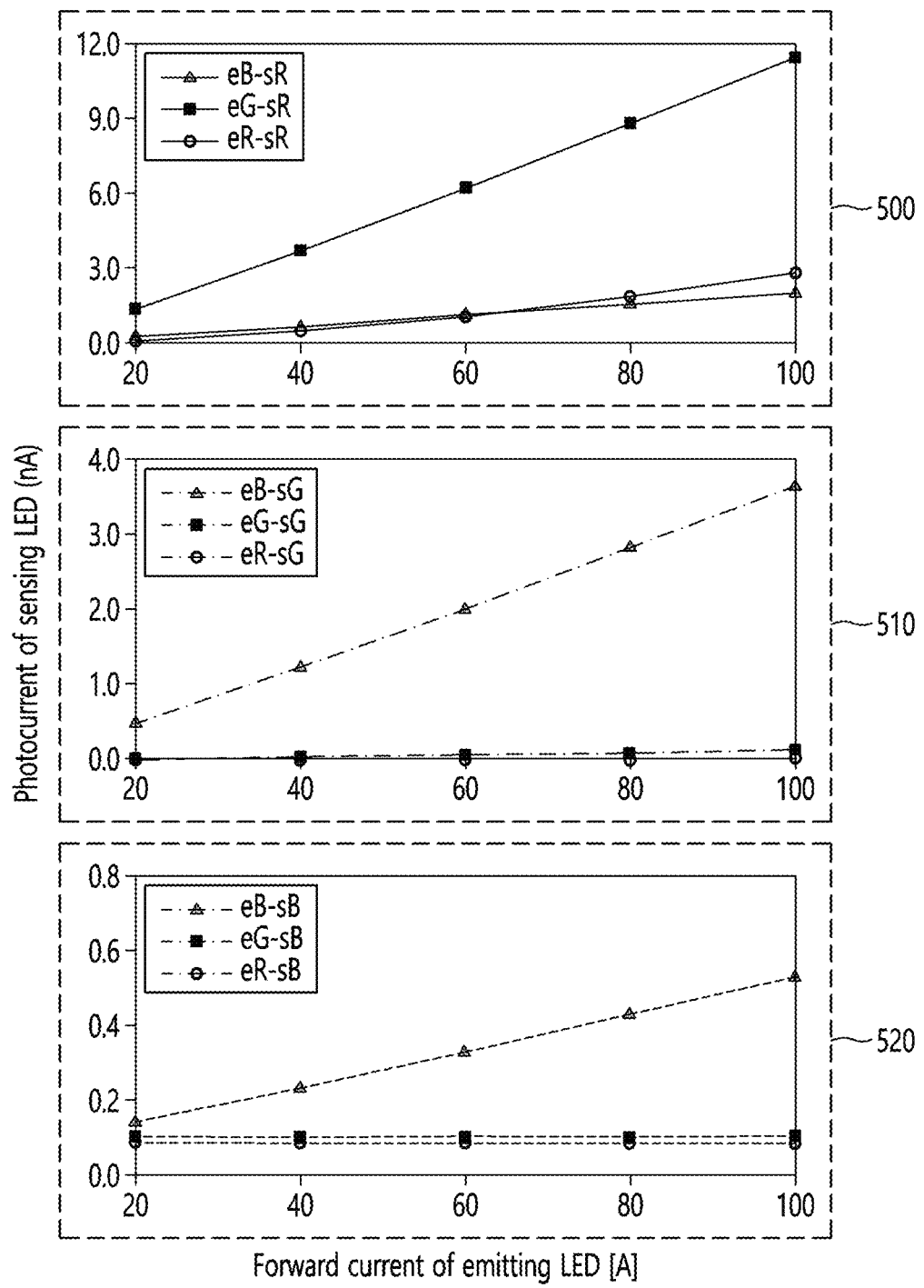
FIGS. 5 and 6 are graphs for explaining photocurrent of a detection LED according to forward current of an emission LED constituting a pixel circuit according to one embodiment of the present disclosure.
Figure 6:
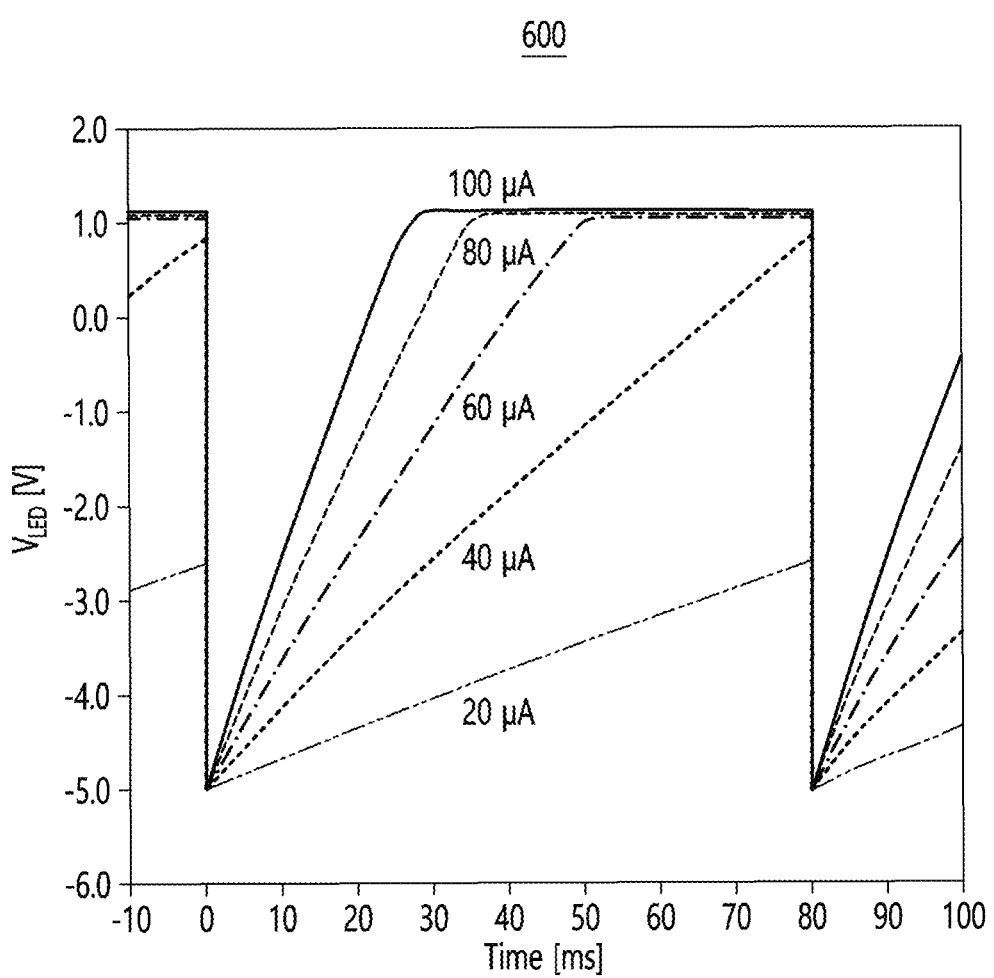

FIGS. 5 and 6 are graphs for explaining photocurrent of a detection LED according to forward current of an emission LED constituting the pixel circuit according to one embodiment of the present disclosure.

FIG. 5 shows a change in photocurrent according to the types of emission LED and detection LEDs in the pixel circuit according to one embodiment of the present disclosure.

Referring to FIG. 5, a graph 500, a graph 510, and a graph 520 show the photocurrent of detection LEDs according to the forward current of an emission LED.

The size of the red, green, and blue LEDs used in the experiment is 200 μm×100 μm.

In the graph 500, the detection LEDs are red LEDs. In the graph 510, the detection LEDs are green LEDs. In the graph 520, the detection LEDs are blue LEDs.

For example, in the graph 500, when the emission LED is a blue LED and the detection LEDs are red LEDs, it is represented by eB-sR. When the emission LED is a green LED and the detection LEDs are red LEDs, it is represented by eG-sR. When the emission LED is a red LED and the detection LEDs are red LEDs, it is represented as eR-sR.

Legends are expressed under the same conditions in the graph 510 and the graph 520.

According to the graphs 500 to 520, red detection LEDs respond to red, green, and blue light, green detection LEDs respond to both green and blue light, and blue LEDs only respond to blue light.

There was no change in the LED combination in which the energy of the emission LED was lower than the energy of the detection LEDs due to bandgap energy.

The eG-sR case had higher sensitivity than the eB-sR case. The graphs 500 to 520 in FIG. 5A shows the result of a combination with one emission LED and one detection LED. Using multiple emission LEDs may achieve a larger reverse current.

For example, eG-sR and eB-sR have reverse currents of 6.2 nA and 1.1 nA at 60 μA, respectively. However, a photocurrent of 7.3 nA is shown when green and blue LEDs are used in combination as emission LEDs.

FIG. 6 shows a result of measuring $V_{LED}$ through a source follower while changing forward current when the emission LED is a green LEDs and the detection LEDs are red LEDs in the pixel circuit according to one embodiment of the present disclosure.

Referring to FIG. 6, a graph 600 shows that the intensity of light incident on red (or detection) LEDs increases as forward current passing through green (or emission) LEDs increases.

Like the graph 600, the $V_{LED}$ became saturated in the shortest time when 100 μA was applied to the emitting LEDs.

Based on the graph 600, it can be confirmed that the slope of $V_{LED}$, which changes over time, depends on the intensity of incident light, and accordingly, the existing LEDs may be used as detection LEDs for light detection.

It can be seen that $V_{LED}$ was initialized to −5 V during the reset period and increased during an integration time of 80 ms.

Based on the graph 600, capacitance may be calculated using the definition of capacitance as shown in Equation 1 below.

$$\Delta Q = C \times \Delta V = \int I(t) dt \quad \text{[Equation 1]}$$

In Equation 1, I(t) represents photocurrent, t represents integration time, C represents equivalent capacitance, and ΔV represents voltage change over integration time.

In the proposed driving structure, a read cycle is set after sufficient integration time.

For example, when a $\Delta V_{LED}$ of at least 2 V is required for detection, a display is 60 Hz. In other cases, such as current conditions of 40 and 20 μA, integration time may be set longer than one frame.

The spectral radiant brightness of the emission LED according to forward current was measured using a spectral radiometer having a focusing lens.

The irradiance Le, Ω of the emitting LEDs may be calculated by integrating the measured spectrum, and the radiant flux Φe may be obtained by multiplying the radiance Le, Ω, the solid angle Ω, and the area of the LEDs.

Assuming that the LEDs have a Lambertian distribution, the solid angle may be it and the area may be 200 μm×100 μm.

Since irradiance is inversely proportional to the square of the distance from a source, the amount of power illuminated by the detection LEDs may be calculated by dividing the radiant flux by the square of the distance.

Figure 7A:
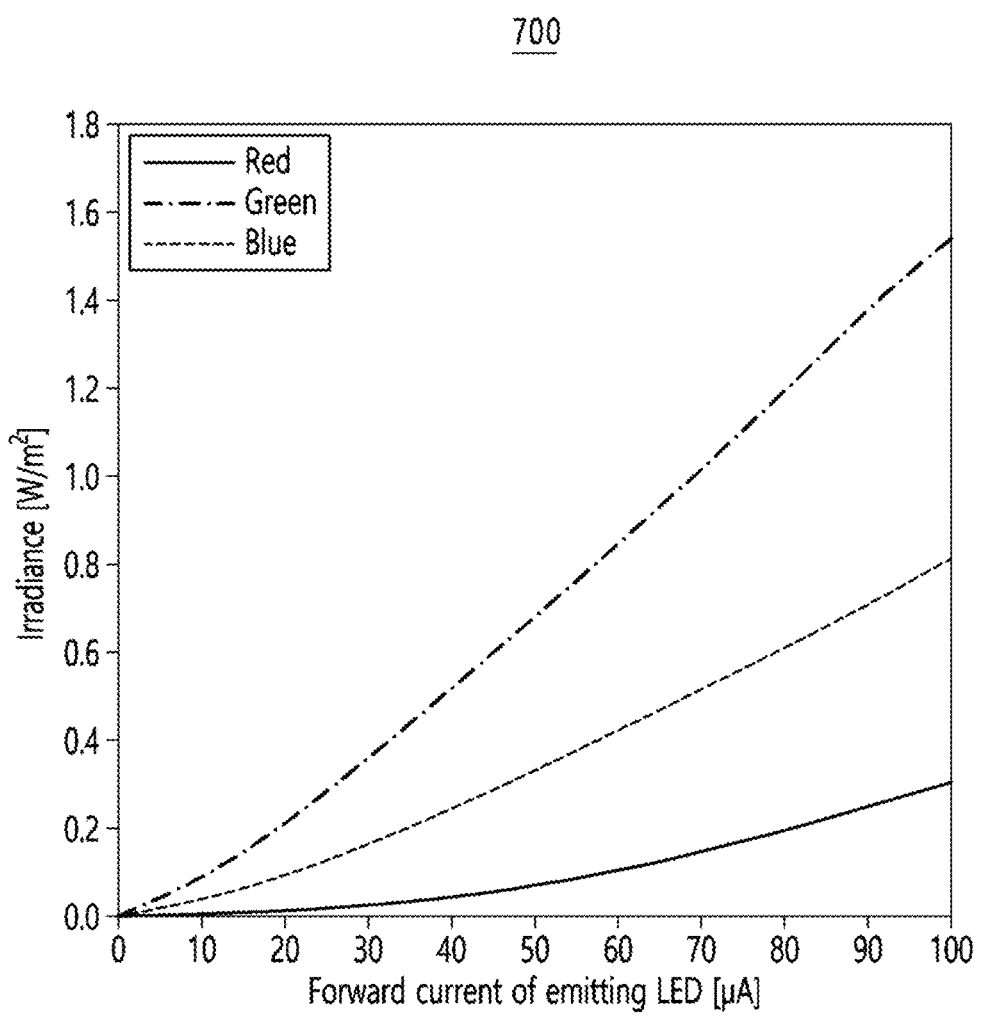
FIGS. 7A and 7B are graphs for explaining irradiance of a plurality of LEDs constituting a pixel circuit according to one embodiment of the present disclosure.
Figure 7B:
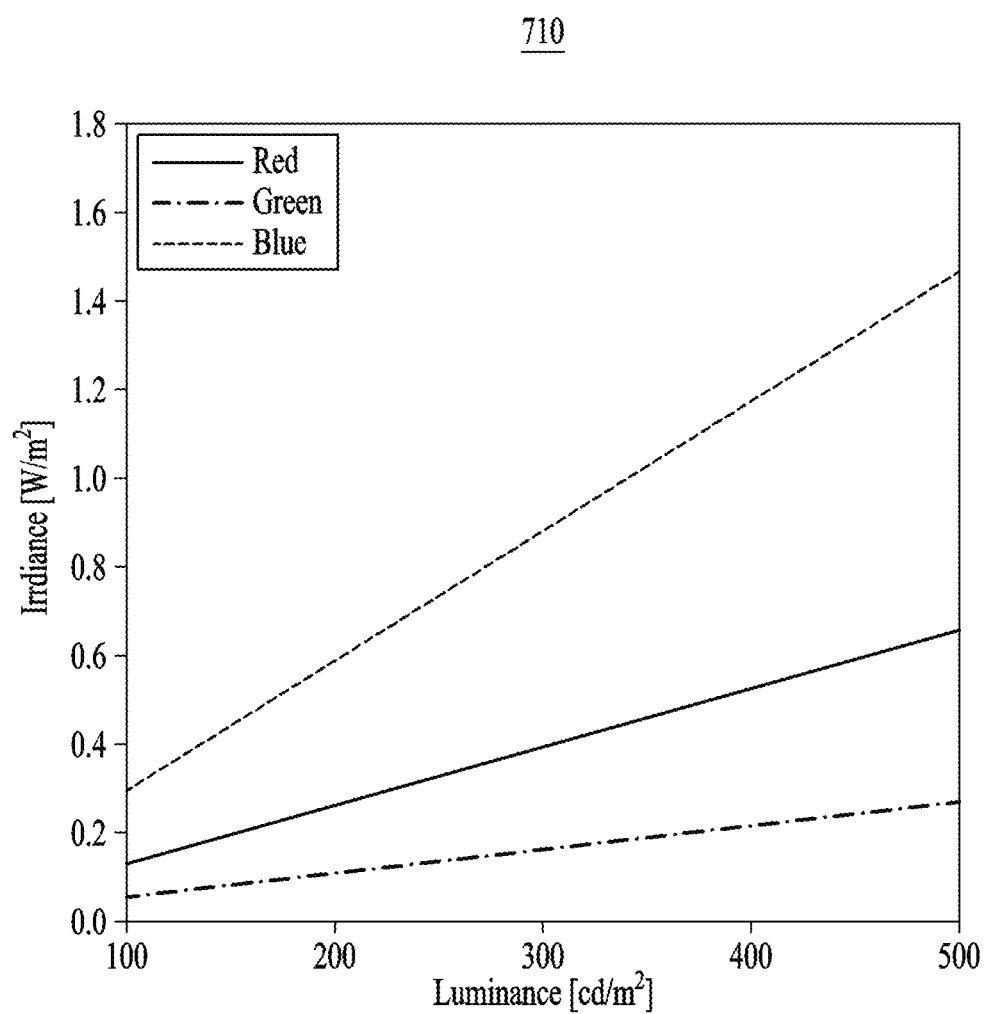

FIGS. 7A and 7B are graphs for explaining irradiance of a plurality of LEDs constituting the pixel circuit according to one embodiment of the present disclosure.

A graph 700 of FIG. 7A shows the measured irradiance of RGB LEDs, and each line represents the colors of LEDs.

Accordingly, in the graph 700, forward currents of 20, 40, 60, 80, and 100 μA correspond to irradiance values of 0.24, 0.52, 0.86, 1.19, and 1.54 W/m², respectively.

To compare the irradiance of the graph 700 with that of a commercial mobile device, the brightness of the device must be converted into irradiance.

Assuming a commercial mobile device of 400 ppi, brightness may be converted to the speed of light (Φv) for a given pixel area.

The relationship between the speed of light (Φv) and radiant flux (Φe) may be expressed by Equation 2 below.

$$\Phi_v = K_m \int \Phi_e V_\lambda d\lambda \quad \text{[Equation 2]}$$

In Equation 2, λ may represent wavelength, Km may represent a constant (683 lm/W at 555 nm), and $V_\lambda$ may represent a luminosity function representing the spectral sensitivity of the human visual system.

As explained above, radiant flux may be obtained using spectral irradiance.

It changes when flowing from 10 μA to 1 mA to LEDs, and accordingly, the speed of light (Φv) and the radiant flux (Φe) have a linear relationship, and the slopes of red, green, and blue LEDs in the experiment are 214, 527, and 951 m/W, respectively.

Accordingly, radiation is calculated by dividing photometry by the slope, and the radiant flux of a display surface may be calculated at given brightness, but according to the Fresnel reflection, only 4% of light is reflected at the glass-air interface.

Accordingly, the irradiance of the detection pixel may be obtained by multiplying the radiant flux by 4% reflectance and dividing by the square of the glass thickness.

The result obtained through the calculation is related to a graph 710 of FIG. 7B, and the graph 710 of FIG. 7B may represent the irradiance of an actual mobile display.

The graph 710 shows the estimated irradiance of a mobile device with 400 ppi and a glass thickness of 30 μm employed in a foldable phone.

Each color line represents the estimated irradiance of a monochromatic situation, and light is reflected at the valleys of a fingerprint, i.e., a glass-air interface.

When an emission LED in a detection area emits light of 300 cd/m², irradiance for detection LEDs is 0.39, 0.16, and 0.88 W/m² for red, green, and blue light, respectively.

According to the graphs 500 to 520, when 40 μA was applied to the emission LED (eG-sR 40 μA), reverse current was 3.72 nA for eG-sR and 3.66 nA for eB-sG 100 μA.

Accordingly, $\Delta V_{LED}$ is 1.2V and irradiance is 0.82 for 16.7 ms, which corresponds to a commercial device that emits blue light of 280 cd/m².

When light emitted from a detection area is green light of 400 cd/m², irradiance is 0.2 W/m², which corresponds to the case of eG-sR 20 μA. Accordingly, a $\Delta V_{LED}$ of 0.5 V is generated for 16.7 ms.

Similarly, 100 cd/m² blue emission light and 150 cd/m² red emission light also have a $\Delta V_{LED}$ of 0.5 V for 16.7 ms.

Figure 8:
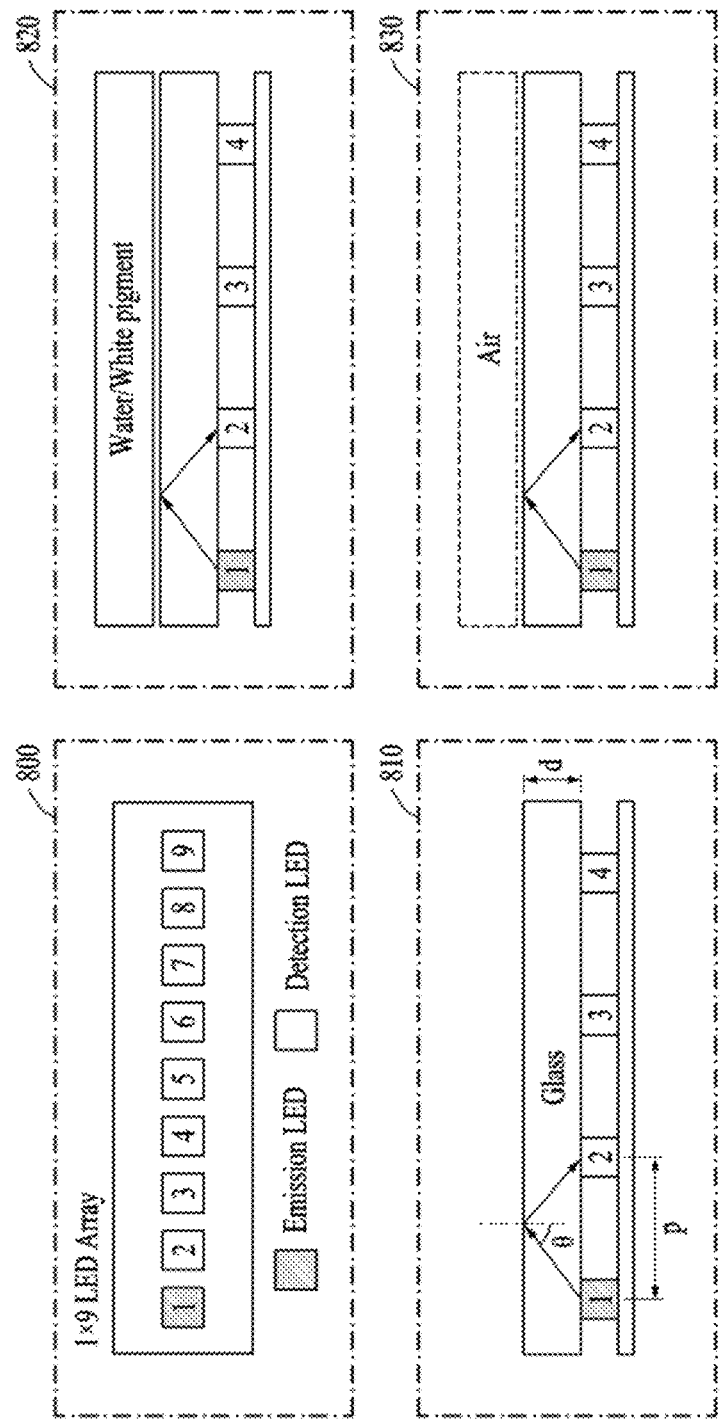
FIG. 8 is a diagram for explaining an array circuit of a pixel circuit according to one embodiment of the present disclosure and experimental conditions.

FIG. 8 is a diagram for explaining an array circuit of the pixel circuit according to one embodiment of the present disclosure and experimental conditions.

Referring to FIG. 8, an array 800 illustrates a top view of a 1×9 LED array circuit, an array 810 illustrates a side view of a case where glass is placed on a 1×9 LED array circuit, an array 820 illustrates a side view of a case where a glass and water/white pigment mixture is placed on a 1×9 LED array circuit, and an array 830 illustrates a side view of a case where glass and air are placed on a 1×9 LED array circuit.

The arrays 800 to 830 have the same configuration of LEDs, but materials placed on the arrays are different.

The arrays 800 to 830 consist of one emission LED and a plurality of detection LEDs. The LEDs are arranged at intervals (p), and glass having a thickness (d) is disposed. Among the detection LEDs, an angle (θ) for detecting reflected light from the first detection LED may be confirmed.

The arrays 800 to 830 may be a 1.5 mm pitch (p) LED array covered with 2 mm thick (d) glass on a conventional printed circuit board (PCB).

The incident angle of light from the emission LED to the glass-air interface may be similar to that of the mentioned mobile phone.

A black wall may be formed between the LEDs to block side light that is not reflected from a glass-air or glass-water interface and directly incident on adjacent LEDs.

Figure 9A:
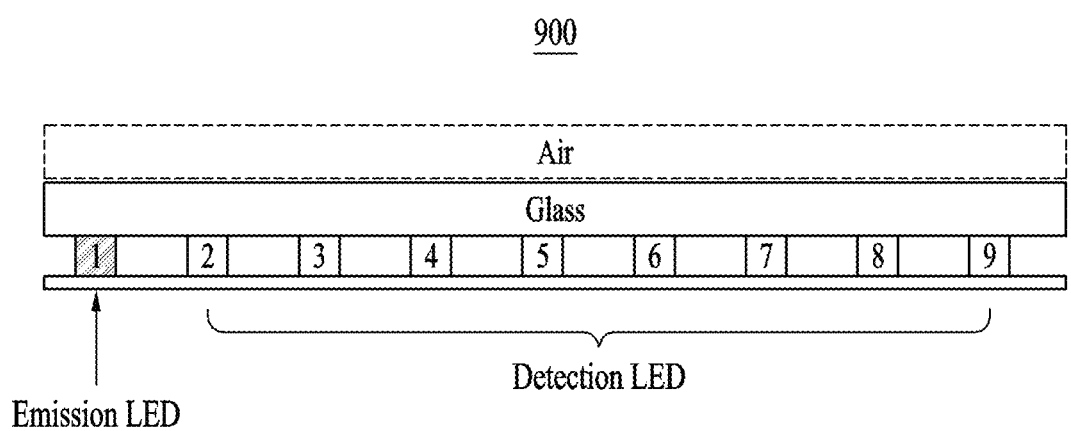
FIGS. 9A and 9B are a diagram and graph for explaining detection characteristics according to the positions of detection LEDs in an array circuit of a pixel circuit according to one embodiment of the present disclosure.
Figure 9B:
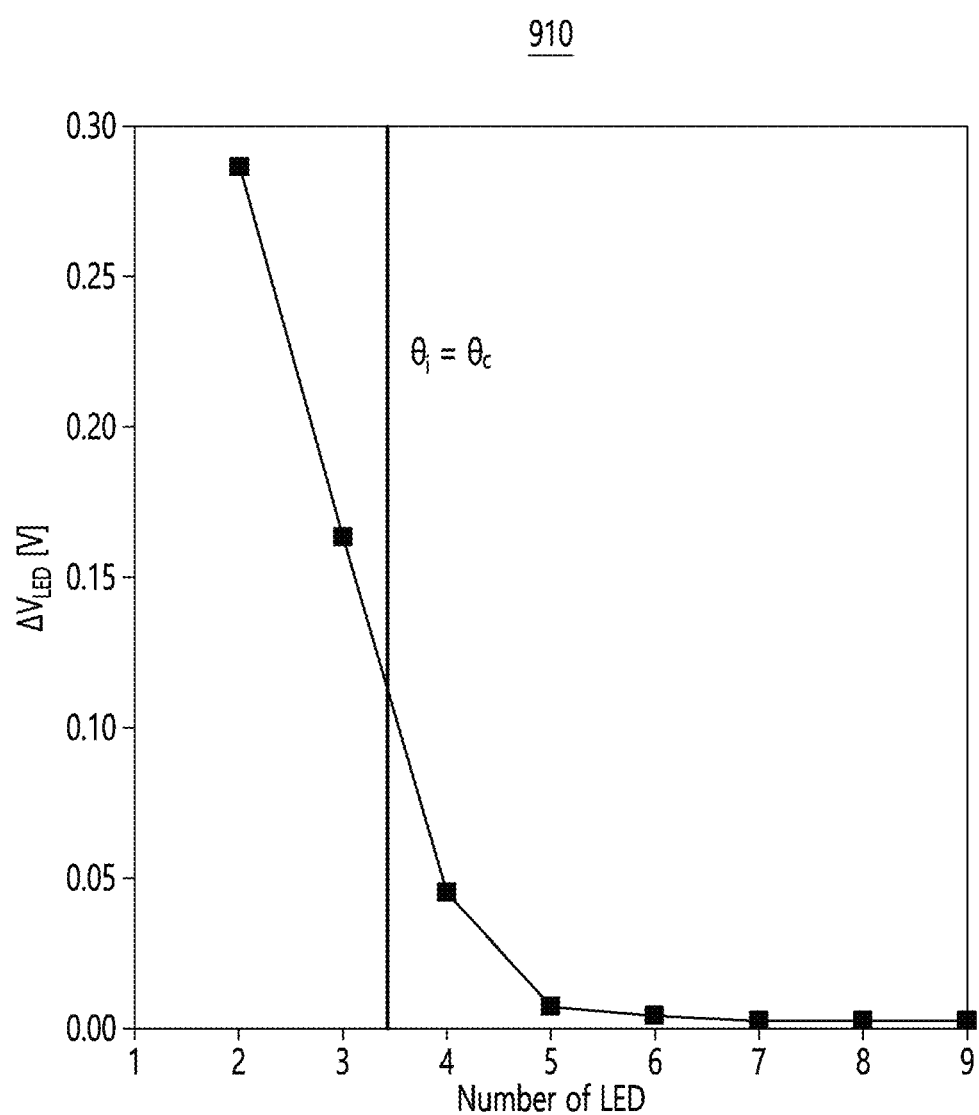

FIGS. 9A and 9B are a diagram and graph for explaining detection characteristics according to the positions of detection LEDs in an array circuit of the pixel circuit according to one embodiment of the present disclosure.

FIG. 9A shows the array 830 of the LED arrays described in FIG. 8. Referring to FIG. 9A, an LED array 900 consists of an emission LED and a plurality of detection LEDs. In the LED array 900, no material is placed on the glass plate, and air is present thereon.

The LED array 900 exemplifies an emission LED as the first LED, but the present disclosure is not limited thereto, and any one of the detection LEDs may be replaced with an emission LED.

FIG. 9B shows the voltage change of a positive electrode according to the position of the detection LEDs according to an incident angle (θi) and a critical angle (θc) using the LED array 900.

Referring to a graph 910 of FIG. 9B, a point where an incident angle (θi) and a critical angle (θc) are the same is a point between the third detection LED and the fourth detection LED.

The fifth detection LED does not respond to the light of the emitting LED, which means that the intensity of reflected light is negligible at the detection LED 4p away.

Accordingly, it can be seen that one emission LED affects the detection LEDs within a radius of 3p.

Optical crosstalk between emission LEDs may be resolved by arranging emission LEDs at intervals of 7p or more.

Total internal reflection (TIR) occurs when an incident angle (θi) is greater than or equal to a critical angle (θc), and the intensity of reflected light in TIR is equal to the intensity of incident light.

However, the vertical component of reflected light perpendicularly incident on a detection LED is reduced by the cosine function (cos(θi)).

The fourth detection LED has an incident angle greater than the critical angle (θc), but the measured $\Delta V_{LED}$ is smaller than that of the third detection LED.

The graph 910 shows that the intensity of reflected light is negligible at a detection LED with an incident angle greater than the critical angle.

In addition, total reflected light may be absorbed by the black matrix of the pixel array. Accordingly, reflected light with an incident angle greater than the critical angle does not affect sensing ability.

Figure 10:
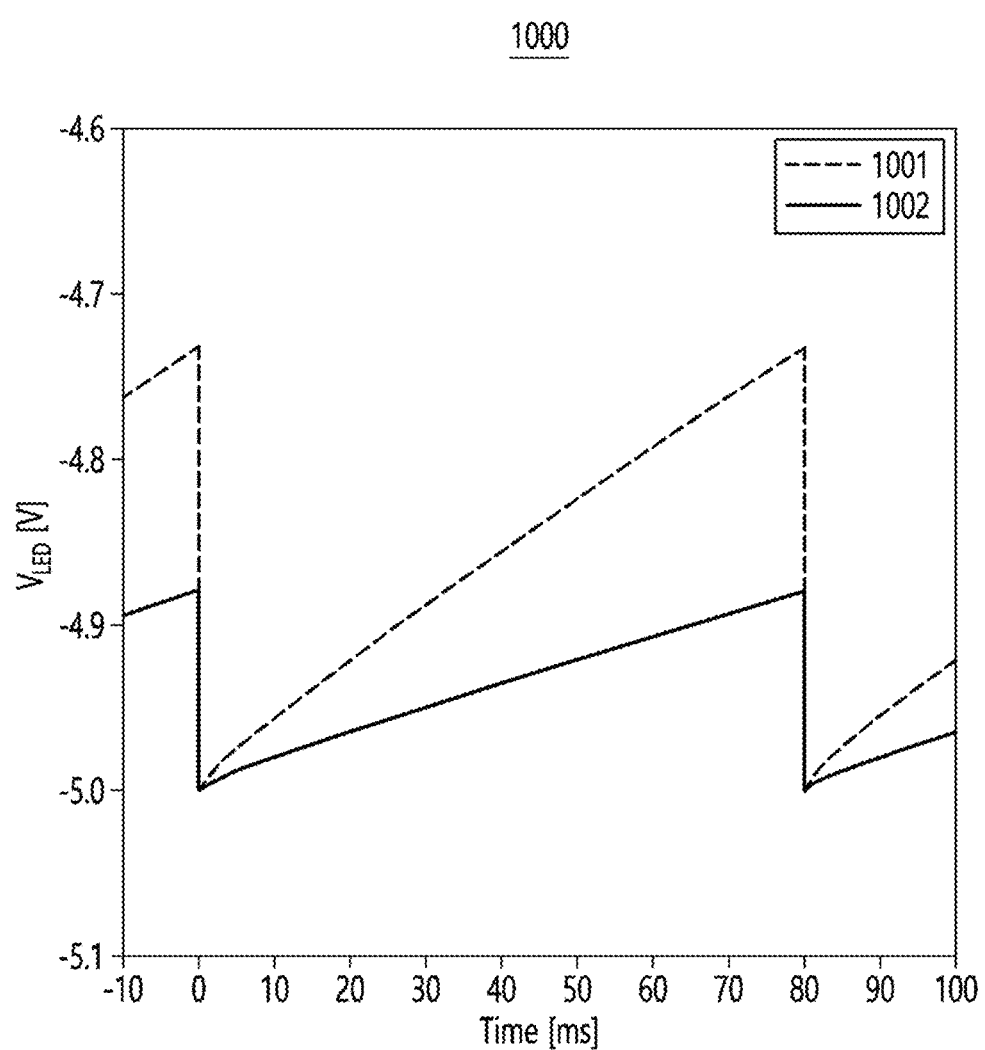
FIG. 10 is a graph for explaining the detection characteristics of a detection LED according to experimental conditions according to one embodiment of the present disclosure.

FIG. 10 is a graph for explaining the detection characteristics of a detection LED according to experimental conditions according to one embodiment of the present disclosure.

A graph 1000 in FIG. 10 shows positive electrode voltages due to the reverse current of detection LEDs in an LED array. Here, the positive electrode voltages are positive electrode voltages measured under glass-air and glass-water/white pigment conditions.

A line 1001 represents the glass-water/white pigment condition, and a line 1002 represents the glass-air condition.

Comparing the line 1001 and the line 1002, it can be seen that the line 1001 has a high positive electrode voltage, and the intensity of reflected light, the positive electrode voltage, and the magnitude of photocurrent are proportional.

In the graph 1000, a current of 100 μA was passed through a green emission LED, and materials on cover glass are compared with air and water/white pigment to compare the intensity of reflected light.

Since reflectance R is determined as in Equation 3 below by the Fresnel equation, a voltage difference occurs when distinguishing a ridge from a valley.

$$R_S = \left(\frac{n_1\cos\theta_i - n_2\cos\theta_t}{n_1\cos\theta_i + n_2\cos\theta_t}\right)^2, R_P = \left(\frac{n_1\cos\theta_t - n_2\cos\theta_i}{n_1\cos\theta_t + n_2\cos\theta_i}\right)^2 \quad \text{[Equation 3]}$$

$$R = (R_S + R_P)/2$$

In Equation 3, the refractive indices $n_1$ and $n_2$ may be determined by materials, the incident angle θi may be determined by a sub-pixel pitch and the thickness of cover glass, and the refractive angle θt may be obtained by the Snell's law.

As shown in the graph 1000, in the case of glass-air and glass-water/white pigment, the positive electrode voltages changed by 0.29 V and 1.13 V, respectively.

According to the Fresnel equation, a voltage change at a glass-air interface should be large, but the voltage change is not large.

Since scattered light by the white pigment enters the detection LEDs, some of light emitted from the LEDs may be reflected at the interface, and the remaining transmitted light may be partially backscattered.

Accordingly, the reflected light may be expressed as Equation 4 below.

$$I_{air} = I_0 R_{FA} + I_0(1-R_{FA})R_{air}$$

$$I_{water} = I_0 R_{FW} + I_0(1-R_{FW})R_{water/W} \quad \text{[Equation 4]}$$

The refractive indices of glass, air, and water were 1.5, 1.0, and 1.33, respectively. The Fresnel reflectances of glass-air ($R_{FA}$) and glass-water ($R_{FW}$) may be 4% and 0.36%, respectively.

Since the LED array was placed in a dark room, the reflectance of the air ($R_{air}$) was zero. Due to the white pigment, glass-water/white pigment may have a reflectance ($R_{water/W}$) of 15.4%.

Accordingly, based on Equation 4, the intensity of the reflected light $I_{air}$ and $I_{water/W}$ may be calculated.

The calculated $I_{air}/I_0$ and $I_{water/W}/I_0$ may be 0.040 and 0.154, respectively.

In the case of glass-water/white pigment, it can be confirmed that the intensity of total reflection light is 3.85 times higher than that of glass-air.

It can be confirmed that $\Delta V_{LED}$ measured for the glass-water/white pigment is 3.93 (1.13/0.29) times higher than that of the glass-air.

Accordingly, the device for recognizing fingerprints according to one embodiment of the present disclosure may detect intensities affected by Fresnel reflection at an interface and backscattering of materials on glass.

Figure 11:
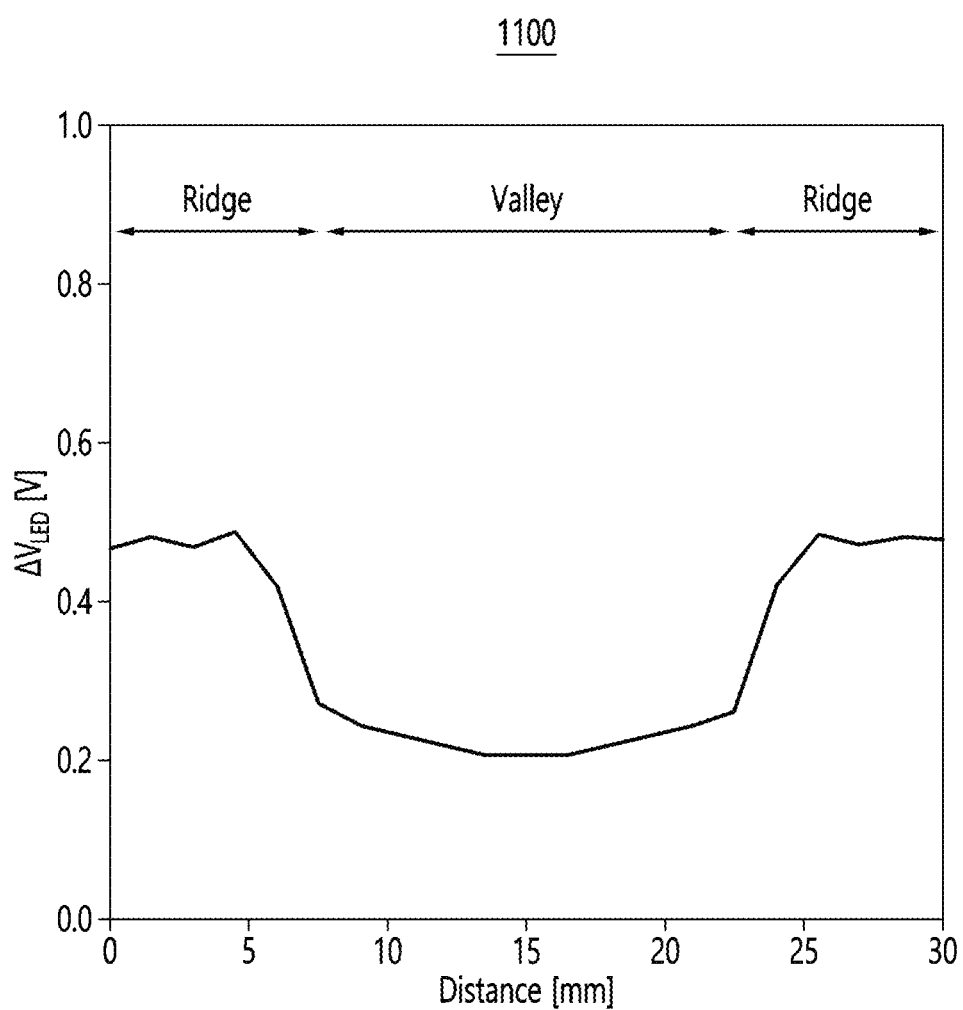
FIG. 11 is a graph for explaining a fingerprint recognition result of a device for recognizing fingerprints according to one embodiment of the present disclosure.

FIG. 11 is a graph for explaining a fingerprint recognition result of the device for recognizing fingerprints according to one embodiment of the present disclosure.

A graph 1100 of FIG. 11 exemplifies a fingerprint recognition result using a simulated fingerprint in which the width of the ridge and valley of the fingerprint is 200 μm and the depth of the valley is 50 μm.

Referring to the graph 1100, it can be seen that there is a clear $\Delta V_{LED}$ difference between the ridge and valley of the fingerprint.

Equation 4 may be expressed as Equation 5 below.

$$I_{Ridge} = I_0 R_{FR} + I_0(1-R_{FR})R_{finger\_ridge}$$

$$I_{valley} = I_0 R_{FV} + I_0(1-F_{RV})R_{finger\_valley} \quad \text{[Equation 5]}$$

In Equation 5, $I_0$, $I_{Ridge}$, and $I_{Valley}$ may represent the intensity of emitted light and light reflected from the ridge and valley, respectively. $R_{FR}$ and $R_{FV}$ may represent reflectances determined by the Fresnel equation of the ridge and valley interfaces, respectively.

As shown in the graph 1100, $R_{finger\_ridge}$ and $R_{finger\_valley}$ are the reflectances of a fake finger measured at the ridge and valley, respectively.

In the graph 1100, $R_{FR}$ and $R_{FV}$ are 0.014% and 4.00%, respectively. $R_{finger\_ridge}$ and $R_{finger\_valley}$ are 9.8% and 1.0%, respectively. Thus, $I_{Ridge}/I_0$ and $I_{valley}/I_0$ are 0.098 and 0.050, respectively.

The graph 1100 shows a voltage change according to photocurrent through the detection LEDs, and the photocurrent is proportional to the total intensity of light reflected from the glass-fake fingerprint interface and light scattered from the fake finger.

As shown in the graph 1100, it can be seen that the $\Delta V_{LED}$ of the ridge is approximately twice the $\Delta V_{LED}$ of the valley, which agrees very well with the calculation result.

The scattered light is scattered in all directions, light from the fake finger follows the inverse square law, and $R_{finger\_ridge}$ and $R_{finger\_valley}$ follow Equation 6.

$$R_{finger\_ridge} : R_{finger\_valley} = \frac{1}{d^2} : \frac{1}{(d+dv)^2} \quad \text{[Equation 6]}$$

In Equation 6, d and dv may represent the thickness of cover glass and the depth of a valley, respectively.

Equation 5 may be expressed as Equation 7 below.

$$I_{Valley} = I_0 R_{FV} + I_0(1-R_{FV})\left(\frac{d}{d+dv}\right)^2 R_{finger\_ridge} \quad \text{[Equation 7]}$$

Sensitivity may be expressed as in Equation 8 below.

$$\text{Sensitivity} = \frac{I_{Ridge}}{I_{Valley}} \quad \text{[Equation 8]}$$

$R_{finger\_ridge}$, d, and dv may be set to 0.098, 2 mm, and 3.75 mm, respectively, and the calculated sensitivity at this time was 1.91.

Sensitivity may be replaced by $\Delta V_{LED,ridge}/\Delta V_{LED,valley}$. Here $\Delta V_{LED,ridge}$ and $\Delta V_{LED,valley}$ may be the positive electrode voltage changes of detection LEDs detecting light in a ridge and valley, respectively.

$\Delta V_{LED,ridge}/\Delta V_{LED,valley} = 0.48/0.22$ is 2.18, which is very close to a sensitivity of 1.91 calculated by Equation 8.

Figure 12:
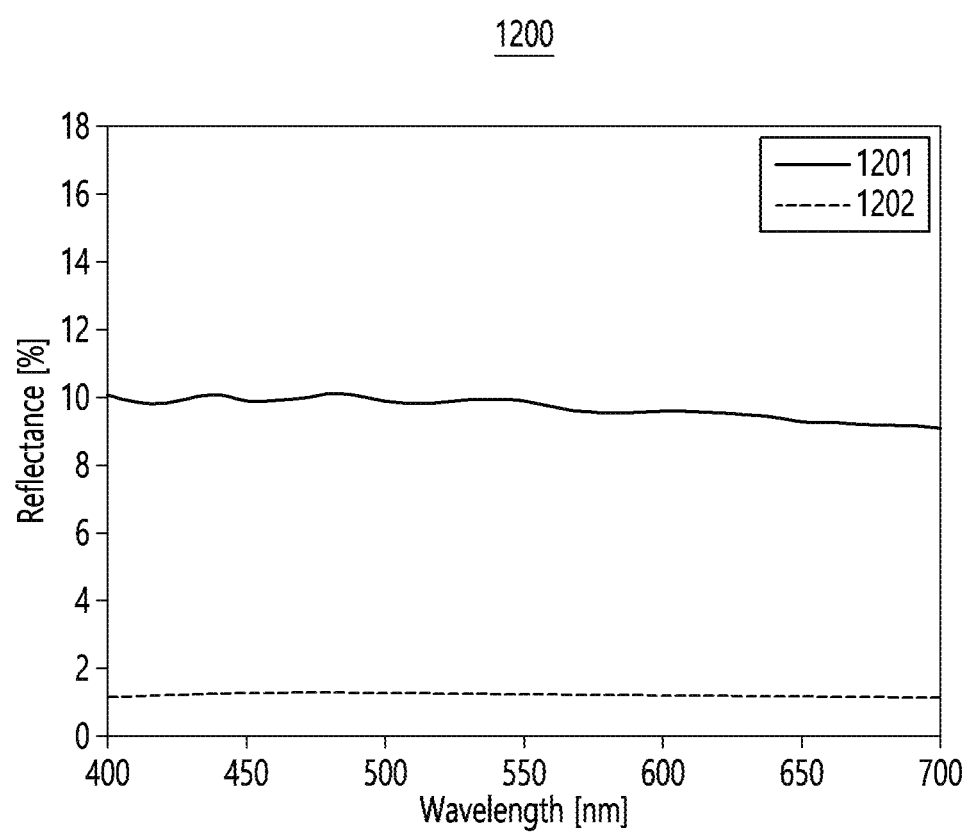
FIGS. 12 to 14 are graphs for explaining reflectance according to the ridges and valleys of a fingerprint measured by a device for recognizing fingerprints according to one embodiment of the present disclosure.
Figure 13:
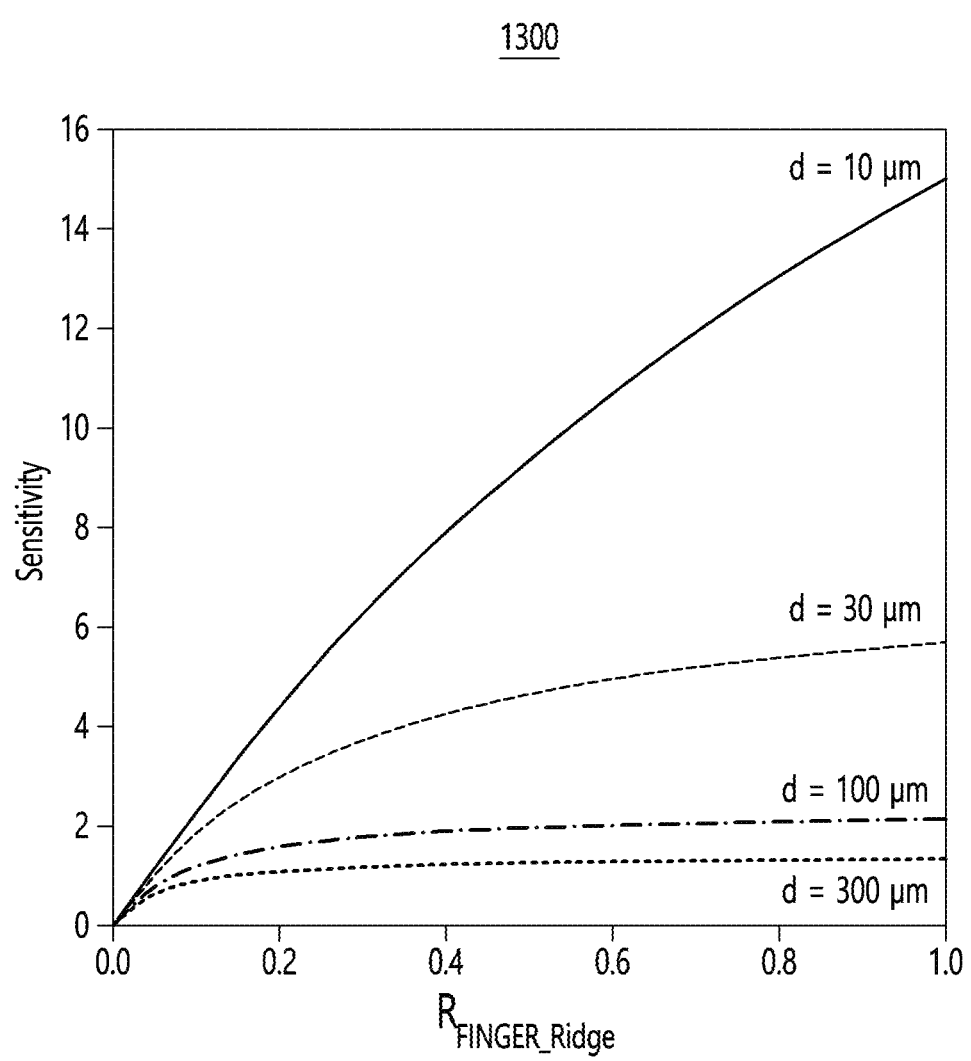
Figure 14:
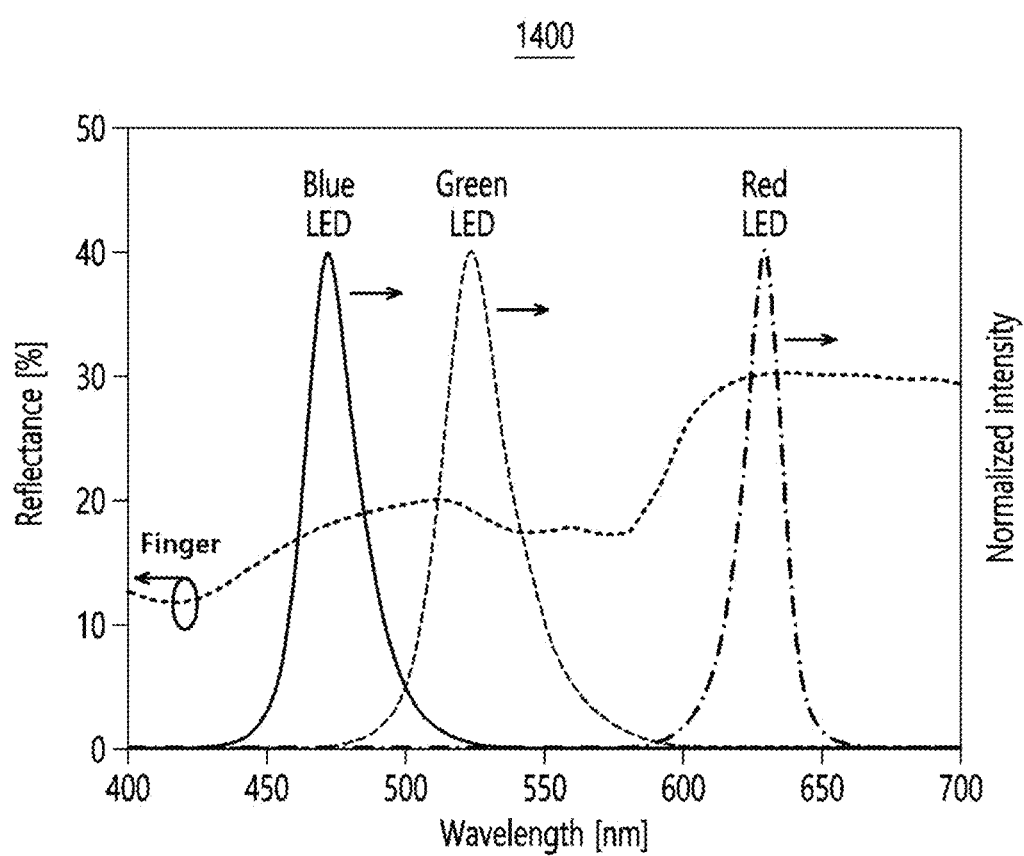

FIGS. 12 to 14 are graphs for explaining reflectance according to the ridges and valleys of a fingerprint measured by the device for recognizing fingerprints according to one embodiment of the present disclosure.

FIG. 12 shows reflectances measured at the ridge and valley of a fingerprint by the device for recognizing fingerprints according to one embodiment of the present disclosure.

Referring to a graph 1200 of FIG. 12, at a ridge 1201, high reflectance is measured, and at a valley 1202, low reflectance is measured.

FIG. 13 shows sensitivity calculated according to the reflectance of the finger according to the thickness of glass.

Referring to a graph 1300 of FIG. 13, the refractive index of the finger ranges from 1.41 to 1.49 in the epidermal tissue.

The reflectance of the glass-ridge interface is between 0.095% and 0.001%, and the valley depth (dv) is 50 μm. As shown in the graph 1300, as the thickness (d) of the glass decreases, the sensitivity increases.

That is, it can be confirmed that the case of thickness (d) of 10 μm has higher sensitivity than the case of 30 μm to 300 μm.

FIG. 14 shows the measured reflectance of the spectrum and the fingertip of the RGB LEDs according to one embodiment of the present disclosure.

Referring to a graph 1400 of FIG. 14, at the peak wavelengths of red (630 nm), green (524 nm), and blue (472 nm) LED lights, the reflectances of the tip of the finger are 30.1%, 19.0%, and 17.8%, respectively.

The expected sensitivities of the RGB emission LED were 3.7, 2.9, and 2.7, respectively, and eR-sR may be the best solution.

However, the red LED has the lowest luminous efficacy compared to the green and blue LEDs, and too high a current must flow through the red emission LED to obtain a detectable voltage change from the red detection LED.

Accordingly, it is preferable that the green LED is determined as an emission LED and the red LED is determined as a detection LED.

In a micro-scale environment, the following points need to be carefully considered.

First, the thickness of cover glass must be considered. The cover glass is much thinner, light intensity is inversely proportional to the square length of a light path, and the length of the light path is proportional to the thickness of the glass.

In this case, the minimum light intensity required for the detection LED to detect may also be reduced because the light path is much shorter.

Since the light of an emitting LED is weak, fingerprint recognition is possible. It is necessary to investigate the current level of the emission LED that may secure sufficient sensitivity.

Second, the range affected by scattered light must be considered, and one emission LED may affect detection LEDs within a radius of 3p.

However, scattered light within a finger may affect farther than 3p, and the scattering effect within the finger may be greater when a real-size finger is placed on a micro-scale display pixel.

Third, subpixel arrangement should also be considered. AMOLED displays have several types of RGB subpixel arrangements to implement color images.

The RGB stripe method was used in the early days of AMOLED displays, and the RGBG subpixel array was developed for higher ppi displays.

Currently, a diamond pixel structure is also being commercialized. A pixel pitch is determined by pixel arrangement and affects the incident angle of light, and the incident angle affects $R_{FV}$ and $R_{FR}$, which affect sensitivity.

The ability to sense the luminous intensity of side light incident directly on adjacent LEDs without reflection is important, and a sidewall or thick PDL (pixel definition layer) may block side light.

Thereamong, a technology that uses a structure with sidewalls to quickly and accurately transfer LED chips is considered a promising technology.

In addition, in an RGB stripe pixel array, when the green sub-pixel of the (m)th column is an emission LED and the red sub-pixel of the (m+1)th column is a detection LED, the blue sub-pixel of the –(m)th column may act as a light-blocking element.

Figure 15A:
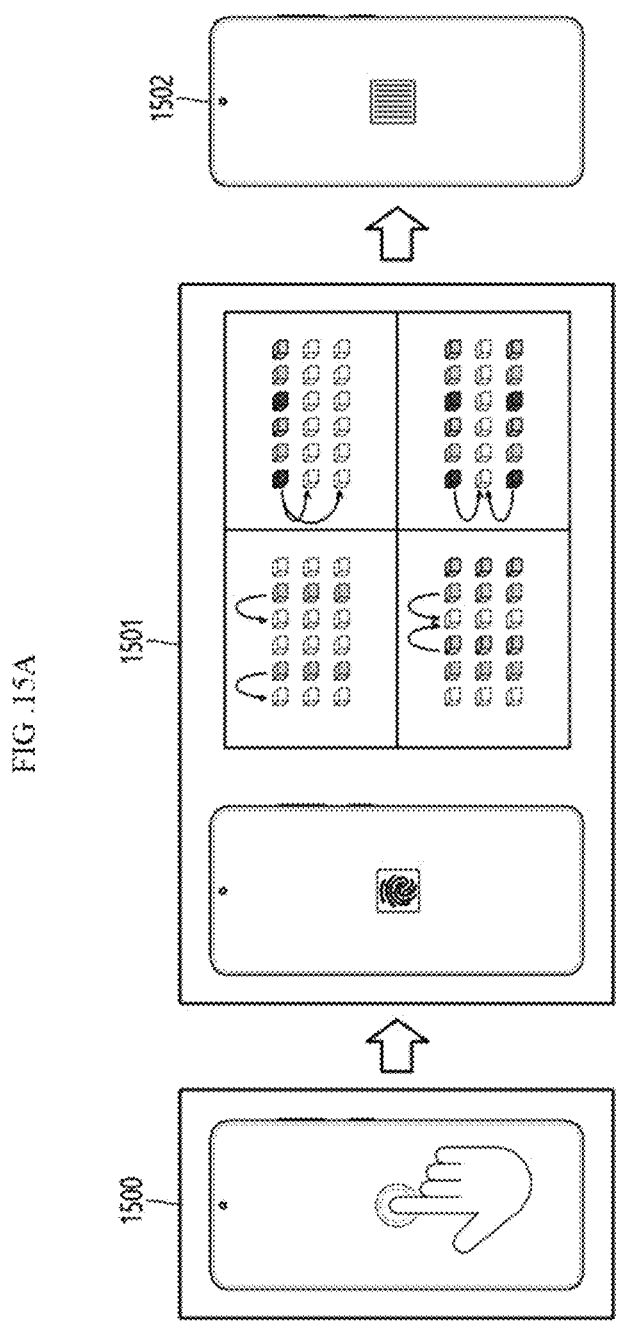
FIGS. 15A and 15B are diagram for explaining the operating characteristics of a device for recognizing fingerprints according to one embodiment of the present disclosure.
Figure 15B:
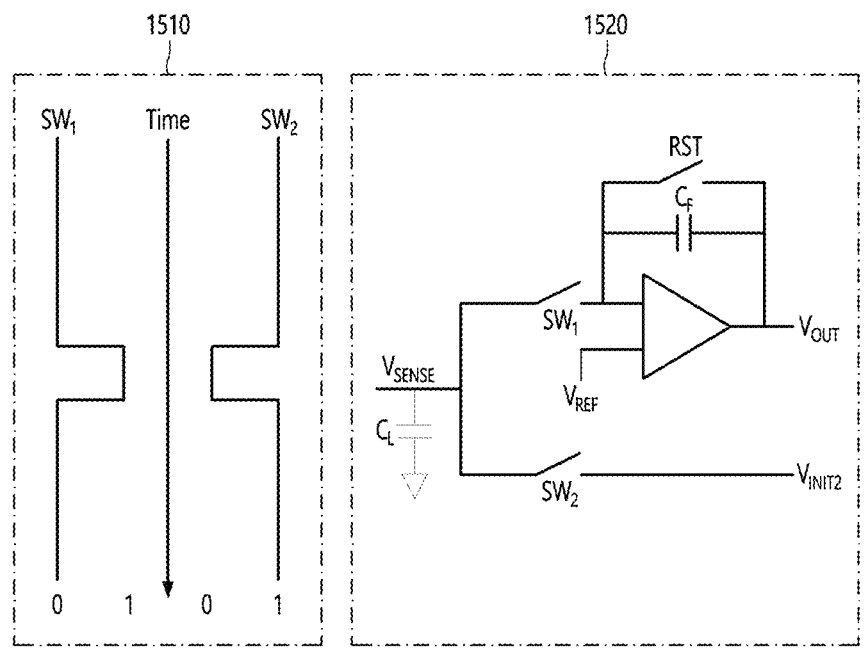

FIGS. 15A and 15B are diagram for explaining the operating characteristics of the device for recognizing fingerprints according to one embodiment of the present disclosure.

FIG. 15A illustrates an operation of distinguishing a non-contact area and a contact area when the device for recognizing fingerprints according to one embodiment of the present disclosure performs fingerprint recognition.

Referring to FIG. 15A, in step 1500, the device for recognizing fingerprints recognizes contact by a user's finger in a specific contact area.

In step 1501, an emission LED and detection LEDs are separately operated for the contact area recognized by the device for recognizing fingerprints, and the detection LEDs do not emit light.

The green LEDs emit light to generate enough photocurrent in the detection LEDs.

When the green LEDs are not sufficient to detect a fingerprint, a blue LED may be used as an additional emission LED, as shown in the lower left arrangement.

In addition, the blue LED may be used as an emission LED and the green LED may be used as an additional emission LED.

As shown in the top right array, one emission LED may generate the photocurrent of several detection LEDs.

The lower right arrangement may solve this problem by using multiple emission LEDs.

In addition, the device for recognizing fingerprints has various pixel arrangements of detection/emission pixels as an example, and the eG-sR case corresponds to the upper left arrangement.

In step 1502, the device for recognizing fingerprints displays light for fingerprint recognition for a recognized contact area. The corresponding region is a region covered by a finger.

That is, the device for recognizing fingerprints shows an actual image when recognizing a fingerprint. The image data of a detection area has been changed, but a user does not recognize the change because the finger covers the detection area.

FIG. 15B shows a circuit and a switch driving signal for distinguishing a non-contact area and a contact area when the device for recognizing fingerprints according to one embodiment of the present disclosure performs fingerprint recognition.

Referring to FIG. 15B, switch application signals 1510 for each time to drive a circuit diagram 1520 are shown.

Pixel data in the non-contact area is not affected. A $V_{SENSE}$ node may be connected to a charge amplifier in the next frame as shown in FIG. 3A to read charge accumulated by photocurrent.

As shown in the circuit diagram 1520, the $V_{SENSE}$ node may be connected to a positive electrode initialization voltage ($V_{INIT2}$) or charge amplifier according to switch control signals ($S_{W1}$ and $S_{W2}$).

The output voltage of the charge amplifier ($V_{OUT}$) may be affected by input charge and a feedback capacitor ($C_F$).

Based on the above driving characteristics, in the device for recognizing fingerprints of the present disclosure, a display area for displaying information and a detection area for detecting a fingerprint operate without mutual influence.

Since the detection pixel of the vertical line and the emission pixel of the horizontal line are not affected, multiple sensing areas are also possible.

During fingerprint recognition, a finger covers a fingerprint recognition area, so ambient light hardly reaches the area touched by the finger and does not affect the detection ability.

Multiple fingerprints may be recognized regardless of the location and number of fingers by adjusting the switch control signals ($SW_1$ and $SW_2$) according to the detection area.

Figure 16:
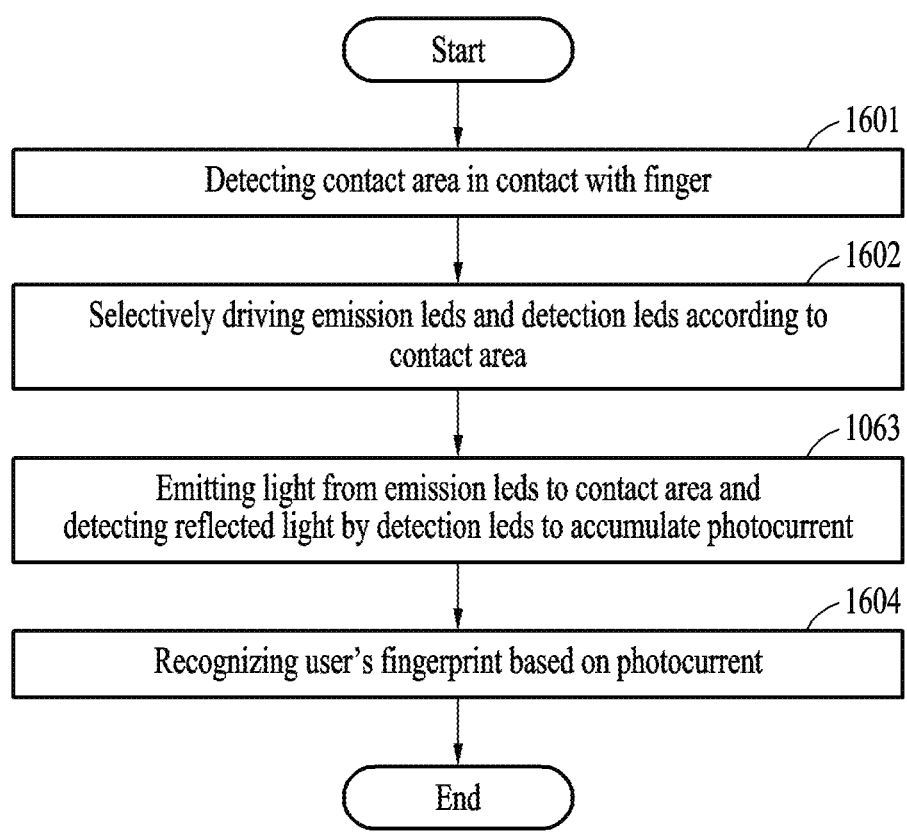
FIG. 16 is a flowchart for explaining a method of operating a device for recognizing fingerprints according to one embodiment of the present disclosure.

FIG. 16 is a flowchart for explaining a method of operating the device for recognizing fingerprints according to one embodiment of the present disclosure.

FIG. 16 shows an example of recognizing a user's fingerprint using LEDs constituting a pixel circuit when a user touches a display screen with a finger according to the method of operating the device for recognizing fingerprints according to one embodiment of the present disclosure.

Referring to FIG. 16, in step 1601, according to the method of operating the device for recognizing fingerprints according to one embodiment of the present disclosure, a contact area where a finger touches is detected.

That is, according to the method of operating the device for recognizing fingerprints, when a user's finger touches a display for fingerprint recognition, the contact area is recognized as a fingerprint recognition area.

In step 1602, according to the method of operating the device for recognizing fingerprints according to one embodiment of the present disclosure, depending on the contact area, an emission LED and detection LEDs are selectively driven.

That is, according to the method of operating the display device, in a pixel circuit including a plurality of LEDs, the LEDs corresponding to a contact area are selectively driven as an emission LED and detection LEDs.

For example, according to the method of operating the display device, among a plurality of LEDs, at least one LED is driven as an emission LED and the remaining LEDs are driven as detection LEDs.

For example, the emission LED may be at least one LED of green and blue LEDs and the detection LED may be a red LED.

In step 1603, according to the method of operating the device for recognizing fingerprints according to one embodiment of the present disclosure, the emission LED emits light to a contact area, and the detection LEDs detect reflected light and accumulate photocurrent.

That is, according to the method of operating the display device, the emission LED may emit light to a detected contact area, the detection LEDs may detect reflected light of the emitted light, and photocurrent according to the detected reflected light may be accumulated in the capacitor in the detection LEDs.

For example, the magnitude of the accumulated light current may be proportional to the intensity of the reflected light.

In step 1604, according to the method of operating the device for recognizing fingerprints according to one embodiment of the present disclosure, based on the photocurrent, the user's fingerprint is recognized.

That is, according to the method of operating the display device, based on the accumulated photocurrent, the user's fingerprint may be recognized by distinguishing the ridges and valleys in the contact area.

For example, according to the method of operating the display device, based on the accumulated photocurrent, the intensity of first reflected light and the intensity of second reflected light are determined, the higher intensity among the determined intensities is determined as the ridge, and the lower intensity is determined as the valley to recognize the user's fingerprint.

Accordingly, according to the present disclosure, the intensity of reflected light may be determined by measuring photocurrent of reverse biased detection LEDs by using, as photodetectors, some LEDs of a plurality of LEDs corresponding to an area in contact with a finger in a micro LED display device and using the remaining LEDs as light-emitting sources, and the ridges and valleys of a fingerprint may be distinguished based on the intensity of the reflected light.

The present disclosure can provide a micro LED display device for recognizing fingerprints without an additional sensor by driving an emission LED and detection LEDs among a plurality of light-emitting diodes (LEDs) constituting a pixel circuit and a method of operating the same.

According to the present disclosure, the intensity of reflected light can be determined by measuring photocurrent of reverse biased detection LEDs by using, as photodetectors, some LEDs of a plurality of LEDs corresponding to an area in contact with a finger in a micro LED display device and using the remaining LEDs as light-emitting sources, and the ridges and valleys of a fingerprint can be distinguished based on the intensity of the reflected light.

According to the present disclosure, cost required for adding hardware for fingerprint recognition can be reduced by expressing data or recognizing fingerprints while emitting light using the same LEDs according to an area in contact with a finger in a pixel circuit of a micro LED display device.

According to the present disclosure, user convenience can be improved by enabling fingerprint recognition on any area of a micro LED display device, and high-resolution fingerprint images can be obtained based on micro LEDs.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A device for recognizing fingerprints, the device comprising:
    a touch sensor for detecting a contact area on a display where a user's finger touches for fingerprint recognition;
    a pixel circuit that comprises a plurality of light-emitting diodes (LEDs) and selectively drives the plurality of LEDs as at least one emission LED and at least one detection LED according to the detected contact area, wherein the at least one emission LED emits light to the detected contact area, the at least one detection LED detects reflected light of the emitted light, and photocurrent according to the detected reflected light is accumulated in a capacitor of the at least one detection LED; and
    a processor configured to control operations of the touch sensor and the pixel circuit and to recognize the user's fingerprint by distinguishing ridges and valleys in the contact area based on the accumulated photocurrent,
    wherein the plurality of LEDs are independently arranged at equal intervals and a critical angle is determined with respect to the intervals, and
    wherein the processor is configured to control the pixel circuit to selectively drive the at least one emission LED and the at least one detection LED among the plurality of LEDs within an interval in which an incident angle at which the emitted light is detected by the at least one detection LED is equal to the determined critical angle.

2. The device according to claim 1, wherein, in the pixel circuit, among red, green, and blue LEDs comprised in the plurality of LEDs, at least one LED of the green and blue LEDs is driven as an emission LED, and the red LED is driven as a detection LED.

3. The device according to claim 2, wherein the green LED is driven as the emission LED and the red LED is driven as the detection LED.

4. The device according to claim 1, wherein the pixel circuit drives the plurality of LEDs as the emission and detection LEDs for the detected contact area on the display, and drives LEDs for remaining areas other than the detected contact area on the display as display LEDs based on data input for the remaining areas other than the detected contact area.

5. The device according to claim 1, wherein the pixel circuit determines an LED among the plurality of LEDs in one line of a vertical line, a horizontal line, and a diagonal line with respect to the detected contact area on the display as an emission LED, and determines LEDs among the plurality of LEDs in the one line as detection LEDs to selectively drive the emission LED and the detection LEDs.

6. The device according to claim 1, wherein, in the pixel circuit, due to reverse current caused by a photoelectric effect of the at least one detection LED, photocurrents of different sizes are accumulated for the ridges and the valleys depending on a size of the detected reflected light, and a larger photocurrent is accumulated for the ridges than for the valleys.

7. A device for recognizing fingerprints, the device comprising:
- a touch sensor for detecting a contact area on a display where a user's finger touches for fingerprint recognition;
- a pixel circuit that comprises a plurality of light-emitting diodes (LEDs) and selectively drives the plurality of LEDs as at least one emission LED and at least one detection LED according to the detected contact area, wherein the at least one emission LED emits light to the detected contact area, the at least one detection LED detects reflected light of the emitted light, and photocurrent according to the detected reflected light is accumulated in a capacitor of the at least one detection LED; and
- a processor configured to control operations of the touch sensor and the pixel circuit and to recognize the user's fingerprint by distinguishing ridges and valleys in the contact area based on the accumulated photocurrent,
- wherein, in the pixel circuit, due to reverse current caused by a photoelectric effect of the at least one detection LED, photocurrents of different sizes are accumulated for the ridges and the valleys depending on a size of the detected reflected light, and a larger photocurrent is accumulated for the ridges than for the valleys, and
- wherein the processor is configured to determine intensity of first reflected light and intensity of second reflected light based on the accumulated photocurrent, and classify, as the ridge, an area on the at least one detection LED storing photocurrent corresponding to the greater light intensity among the intensity of the first reflected light and the intensity of the second reflected light and classify an area on the remaining detection LEDs as the valley.

8. A method of operating a device for recognizing fingerprints, the method comprising:
- detecting, by a touch sensor, a contact area on a display in contact with a user's finger for fingerprint recognition;
- selectively driving, by a pixel circuit comprising a plurality of light-emitting diodes (LEDs), the plurality of LEDs as at least one emission LED and at least one detection LED according to the detected contact area;
- emitting light from the at least one emission LED to the detected contact area and detecting reflected light of the emitted light by the at least one detection LED in the pixel circuit to accumulate photocurrent according to the detected reflected light in a capacitor of the at least one detection LED; and
- recognizing, by a processor, the user's fingerprint by distinguishing ridges and valleys in the contact area based on the accumulated photocurrent,
- wherein the plurality of LEDs are independently arranged at equal intervals and a critical angle is determined with respect to the intervals, and
- wherein the selectively driving comprises selectively driving the at least one emission LED and the at least one detection LED among the plurality of LEDs within an interval in which an incident angle at which the emitted light is detected by the at least one detection LED is equal to the determined critical angle.

9. The method according to claim 8, wherein the selectively driving comprises driving at least one LED of green and blue LEDs among red, green, and blue LEDs comprised in the plurality of LEDs as an emission LED and driving the red LED as a detection LED.

10. The method according to claim 9, wherein, in the emitting, the green LED is driven as the emission LED and the red LED is driven as the detection LED.

11. The method according to claim 8, wherein the selectively driving comprises driving, by the pixel circuit, the plurality of LEDs as the emission and detection LEDs for the detected contact area on the display, and driving LEDs for remaining areas other than the detected contact area on the display as display LEDs based on data input for the remaining areas other than the detected contact area.

12. The method according to claim 8, wherein the emitting comprises accumulating photocurrents of different sizes for the ridges and the valleys depending on a size of the detected reflected light due to reverse current caused by a photoelectric effect of the at least one detection LED, wherein a larger photocurrent is accumulated for the ridges than for the valleys.

13. A method of operating a device for recognizing fingerprints, the method comprising:
- detecting, by a touch sensor, a contact area on a display in contact with a user's finger for fingerprint recognition;
- selectively driving, by a pixel circuit comprising a plurality of light-emitting diodes (LEDs), the plurality of LEDs as at least one emission LED and at least one detection LED according to the detected contact area;
- emitting light from the at least one emission LED to the detected contact area and detecting reflected light of the emitted light by the at least one detection LED in the pixel circuit to accumulate photocurrent according to the detected reflected light in a capacitor of the at least one detection LED; and
- recognizing, by a processor, the user's fingerprint by distinguishing ridges and valleys in the contact area based on the accumulated photocurrent,
- wherein the emitting comprises accumulating photocurrents of different sizes for the ridges and the valleys depending on a size of the detected reflected light due to reverse current caused by a photoelectric effect of the at least one detection LED, wherein a larger photocurrent is accumulated for the ridges than for the valleys, and
- wherein the recognizing comprises determining intensity of first reflected light and intensity of second reflected light based on the accumulated photocurrent, and classifying, as the ridge, an area on the at least one detection LED storing photocurrent corresponding to the greater light intensity among the intensity of the first reflected light and the intensity of the second reflected light and classifying an area on the remaining detection LEDs as the valley.

* * * * *